US011989096B2

(12) United States Patent
MacLean et al.

(10) Patent No.: US 11,989,096 B2
(45) Date of Patent: May 21, 2024

(54) SEARCH AND RETRIEVAL DATA PROCESSING SYSTEM FOR COMPUTING NEAR REAL-TIME DATA AGGREGATIONS

(71) Applicant: Ab Initio Technology LLC, Lexington, MA (US)

(72) Inventors: John MacLean, Melbourne (AU); Paul Veiser, Singapore (SG)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 15/360,449

(22) Filed: Nov. 23, 2016

(65) Prior Publication Data

US 2017/0177446 A1 Jun. 22, 2017

Related U.S. Application Data

(60) Provisional application No. 62/270,257, filed on Dec. 21, 2015.

(51) Int. Cl.
*G06F 11/14* (2006.01)
*G06F 11/30* (2006.01)
(Continued)

(52) U.S. Cl.
CPC ...... *G06F 11/1451* (2013.01); *G06F 11/3082* (2013.01); *G06F 11/3438* (2013.01);
(Continued)

(58) Field of Classification Search
CPC ................. G06F 11/1451; G06F 16/21; G06F 16/24568; G06F 16/23; G06F 16/24565;
(Continued)

(56) References Cited

U.S. PATENT DOCUMENTS 6,654,907 B2    11/2003  Stanfill et al.
8,856,807 B1 *  10/2014  Khapre .................. G06Q 30/06
                                                    714/48

(Continued)

FOREIGN PATENT DOCUMENTS

CN    103080932    5/2013
CN    105051729    11/2015
(Continued)

OTHER PUBLICATIONS

International Search Report and Written Opinion in PCT/US2016/067840, dated Apr. 3, 2017.
(Continued)

*Primary Examiner* — Tony Mahmoudi
*Assistant Examiner* — Kamal K Dewan
(74) *Attorney, Agent, or Firm* — Fish & Richardson P.C.

(57) ABSTRACT

A method performed by a data processing system for processing data, the method including: intermittently receiving data from one or more data streams, the received data including data records; detecting two or more particular data records in the received data records, where the detected two or more particular data records each include a particular identifier; for that particular identifier, creating a collection of data records; for at least one particular data record included in the collection of data records, searching data records for a historical aggregation of data; and computing combined data; modifying a data record by inserting the combined data into a field of the data record and by inserting data from at least one of the data records in the collection into another field of the data record; based on applying the rules, writing to memory one or more instructions for initiation of one or more actions.

22 Claims, 19 Drawing Sheets

(51) Int. Cl.

| | | |
|---|---|---|
| *G06F 11/34* | (2006.01) | |
| *G06F 16/21* | (2019.01) | |
| *G06F 16/23* | (2019.01) | |
| *G06F 16/2455* | (2019.01) | |
| *G06F 17/40* | (2006.01) | |

(52) U.S. Cl.
CPC .......... *G06F 11/3476* (2013.01); *G06F 16/21* (2019.01); *G06F 16/23* (2019.01); *G06F 16/24565* (2019.01); *G06F 16/24568* (2019.01); *G06F 17/40* (2013.01); *G06F 2201/84* (2013.01)

(58) Field of Classification Search
CPC ............. G06F 11/3082; G06F 11/3438; G06F 11/3476; G06F 17/40; G06F 17/30345; G06F 17/30289; G06F 17/30516; G06F 2201/84
USPC .......................................................... 707/625
See application file for complete search history.

(56) References Cited

U.S. PATENT DOCUMENTS

| | | | | |
|---|---|---|---|---|
| 2003/0084053 | A1* | 5/2003 | Govrin | G06Q 10/10 |
| 2006/0173926 | A1* | 8/2006 | Kornelson | G06F 16/258 |
| 2007/0106711 | A1* | 5/2007 | Buros | G06F 16/254 |
| 2008/0027957 | A1* | 1/2008 | Bruckner | G06F 16/244 |
| 2009/0287628 | A1 | 11/2009 | Indeck et al. | |
| 2010/0185618 | A1* | 7/2010 | Peterson | G06F 16/24556 707/737 |
| 2012/0130940 | A1* | 5/2012 | Gattani | G06F 16/283 707/791 |
| 2012/0131139 | A1* | 5/2012 | Siripurapu | G06F 16/951 709/217 |
| 2013/0046783 | A1* | 2/2013 | Zhang | G06F 16/24568 707/770 |
| 2013/0151458 | A1 | 6/2013 | Indeck et al. | |
| 2013/0204886 | A1* | 8/2013 | Faith | G06Q 30/0631 707/756 |
| 2013/0262035 | A1* | 10/2013 | Mills | G06F 16/2322 702/188 |
| 2014/0040213 | A1* | 2/2014 | Rossi | H04M 15/00 707/693 |
| 2014/0324530 | A1 | 10/2014 | Thompson | |
| 2014/0358982 | A1* | 12/2014 | Pareek | H04L 41/0604 709/201 |
| 2015/0066861 | A1* | 3/2015 | Ritto | G06F 16/21 707/661 |
| 2015/0120607 | A1 | 4/2015 | Ramsunder | |
| 2015/0161214 | A1* | 6/2015 | Kali | G06F 16/24568 707/758 |
| 2016/0179898 | A1* | 6/2016 | Zhang | G06F 16/24568 707/722 |
| 2017/0006135 | A1* | 1/2017 | Siebel | H04L 67/02 |
| 2017/0032016 | A1* | 2/2017 | Zinner | G06Q 10/063 |
| 2017/0039245 | A1* | 2/2017 | Wholey, III | G06F 16/2428 |
| 2017/0061315 | A1* | 3/2017 | Leonard | G06F 16/2462 |
| 2017/0083175 | A1* | 3/2017 | Layman | H04L 43/045 |
| 2017/0083368 | A1* | 3/2017 | Bishop | G06F 3/0631 |
| 2018/0225158 | A1* | 8/2018 | Guigui | G06F 9/542 |
| 2019/0317947 | A1* | 10/2019 | Xu | H04L 67/10 |
| 2020/0082340 | A1* | 3/2020 | Wing | G06F 1/30 |

FOREIGN PATENT DOCUMENTS

| | | |
|---|---|---|
| JP | 2015528967 | 10/2015 |
| JP | 2017517775 | 6/2017 |
| WO | WO 2014021978 | 2/2014 |
| WO | WO 2015191120 | 12/2015 |

OTHER PUBLICATIONS

Tibco, Event Processing, http://www.tibco.com/products/event-processing, [Jan. 7, 2015] (3 pages).
Tibco, Complex Event Processing, http://www.tibco.com/products/event-processing/complex-event-processing [Jan. 8, 2015] (4 pages).
International Preliminary Report on Patentability in PCT/US2016/067840, dated Jun. 26, 2018, 7 pages.
Amagasa and Kitagawa, "The stream data using this and stream processing engine, and there is [OLAP-]," Deim Forum 2014 D3-1, the Institute of Electronics, Information and Communication Engineers data engineering research special committee Japanese database society, The Information Processing Society of Japan database system study group, retrieved from URL <https://db-event.jpn.org/deim2014/final/proceedings/D3-1.pdf>, May 3, 2014, English translation.
Nishizawa, "Complex Event Processing," IT Architect, JP, IDG Japan, May 28, 2009, 23:128-141, English translation.
Extended European Search Report in European Appln. No. 20191384.5 dated Mar. 1, 2021, 9 pages.
[Author Unknown], "General SQL Server7.0 power powerful tuning," Enterprise Servers World 2001, Apr. 2001, 4(4):106-109 (with English Translation).
JP Office Action in Japanese Appln. No. 2019-193640, dated Dec. 25, 2020, 6 pages (with English Translation).
Nakabasami et al., "Cost-Based Optimization of Queries in StreamOLAP," The 7th Forum on Data Engineering and Information Management, Mar. 4, 2015, 1-8 (with English Translation).
IN Office Action in Indian Appln. No. 201827026494, dated Nov. 11, 2020, 7 pages.
General SQL Server7.0 power intensive tuning, Enterprise Servers World, Japan, IDG Japan, Jan. 1, 2001, vol. 4, No. 4, pp. 106 to 109.
Nakabasami, et al., "Query Optimization Technique in Stream OLAP," The 7th Forum of Data Engineering and Information Management, Mar. 4, 2015, pp. 1-8, retrieved from URL: <http://db-event.jpn.org/deim2015/paper/29.pdf>, 16 pages (with English Translation).
Office Action in Japanese Appln. No. 2019-193640, dated Sep. 30, 2021, 7 pages (with English translation).
Office Action in Japanese Appln. No. 2019-193640, dated Mar. 31, 2022, 5 pages (with English translation).
Notice of Allowance in Chinese Appln. No. 201680075432.6, dated May 29, 2023, 6 pages (with English translation).

* cited by examiner

SEARCH AND RETRIEVAL DATA PROCESSING SYSTEM FOR COMPUTING NEAR REAL-TIME DATA AGGREGATIONS

CLAIM OF PRIORITY

This application claims priority under 35 U.S.C. § 119(e) to provisional U.S. Patent Applications 62/270,257, filed on Dec. 21, 2015, the entire contents of which are hereby incorporated by reference.

TECHNICAL FIELD

This description relates to methods and data structures that are especially adapted to provide data retrieval from data sources distributed in a network.

BACKGROUND

In an example, systems that execute applications aggregate data by retrieving data that is stored in a data warehouse (e.g., a data ware house related to logistic hubs, distributed machinery, mobile communications or retail stores) and aggregating that data in batch. These applications are often referred to as batch applications, because they store received data (in batch) in a data warehouse and then retrieve that data back out of the data warehouse to compute an aggregation, causing a latency as the data is aggregated. Additionally, these applications struggle with aggregating real-time data (and/or the warehoused data), because of the large volumes of data involved.

Referring to FIG. 1A, environment 2 includes different applications (e.g., engines) to implement different types of applications against batch data. In this example, data from data sources 3 is stored in enterprise data warehouse (EDW) 4. Logistics applications 5a, 5b, 5c, 5d (each implementing different operations, rules or applications) each individually retrieves data appropriate for that application from EDW 4. Each of these different applications 5a, 5b, 5c, 5d acts on different data types and streams and thus retrieves the appropriate data from EDW 4. Each of these different applications 5a, 5b, 5c, 5d may execute many operations, rules and applications. Each application uses a same generic workflow.

In another example, a user interface for rules, e.g., as described in U.S. Pat. No. 9,002,770, enables a user (e.g., a user) to define a rule (e.g., SMS usage >40) for use in an application, without having to write computer code to access appropriate data records in a database to retrieve relevant data for the rule. Generally, when a user defines an application, he/she writes out rules (e.g., in a spreadsheet) and then sends the spreadsheet to a computer programmer to write the code to implement the rule. With the user interface for rules, the user can simply select in the user interface a rule (e.g., or an icon representing a rule) and specify a value or a condition for that rule. The system is configured to generate the required instructions to retrieve the appropriate data specified by the event. Through the user interface for rules, the user can edit the rules, without having to employ a programmer to edit the rules.

SUMMARY

In some examples, a method performed by a data processing system for processing data includes intermittently receiving data from one or more data streams, the received data including data records; as data from the one or more data streams continue to be received, detecting two or more particular data records in the received data records, where the detected two or more particular data records each include a particular identifier; for that particular identifier, creating a collection of data records that include the detected two or more particular data records; for at least one particular data record included in the collection of data records, searching data records for a historical aggregation of data associated with the particular identifier, with the historical aggregation being a pre-computed data aggregation from a prior time period; and computing combined data, based on the at least one particular data record and on the historical aggregation; modifying a data record by inserting the combined data into a field of the data record and by inserting data from at least one of the data records in the collection into another field of the data record; processing the modified data record by applying one or more rules to the modified data record; based on applying the rules, writing to memory one or more instructions for initiation of one or more actions; and publishing the one or more instructions to a queue for initiation of the one or more actions. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In this aspect, inserting the data from the at least one of the data records in the collection into the other field of the data record includes: inserting data from the at least one particular data record included in the collection into the other field of the data record modified by inserting. The collection of data records is a first data record including data from the data records, and wherein the method further includes: collecting a plurality of data records; publishing the data records to a single queue; from the queue, detecting the two or more particular data records; joining together the two or more particular data records into the first data record, with the two or more particular data records include data representing being different types of events; and augmenting the first data record with the combined data for the at least one particular data record. The prior time period is a time prior to performance of the detecting. The actions include attaching, to the first data record, customer profile data for a customer associated with a particular event included in the first data record; and attaching to the first data record an appendable lookup file (ALF) with a historical aggregation for the particular event.

In this aspect, computing the combined data includes: adding incremental data to the historical aggregation, with the incremental data including data from a time at which the historical aggregation was computed to a near present time that is within a minute of the present time; and producing, based on the adding of the incremental data, a near real-time aggregation of the data. The method of claim 1, further including: receiving, from a client device of a user, data representing one or more rules defining an application; generating, based on the received data, the one or more rules that define the application; and implementing, based on executing on the one or more rules, the application against the one or more data streams intermittently received. Receiving the one or more data streams includes: receiving a first data stream with data representing a first type of event; and receiving a second data stream with data representing a second type of event.

In this aspect, executing one or more applications against a published action trigger included in the one or more instructions. A data record includes an event. Searching includes searching in a data repository or searching in-memory.

All or part of the foregoing may be implemented as a computer program product including instructions that are stored on one or more non-transitory machine-readable storage media and/or one or more computer-readable hardware storage devices that are a hard drive, a random access memory storage device, such as a dynamic random access memory, machine-readable hardware storage devices, and other types of non-transitory machine-readable storage devices, and that are executable on one or more processing devices. All or part of the foregoing may be implemented as an apparatus, method, or electronic system that may include one or more processing devices and memory to store executable instructions to implement the stated functions.

The details of one or more embodiments are set forth in the accompanying drawings and the description below. Other features, objects, and advantages of the techniques described herein will be apparent from the description and drawings, and from the claims.

DESCRIPTION

Figure 1A:
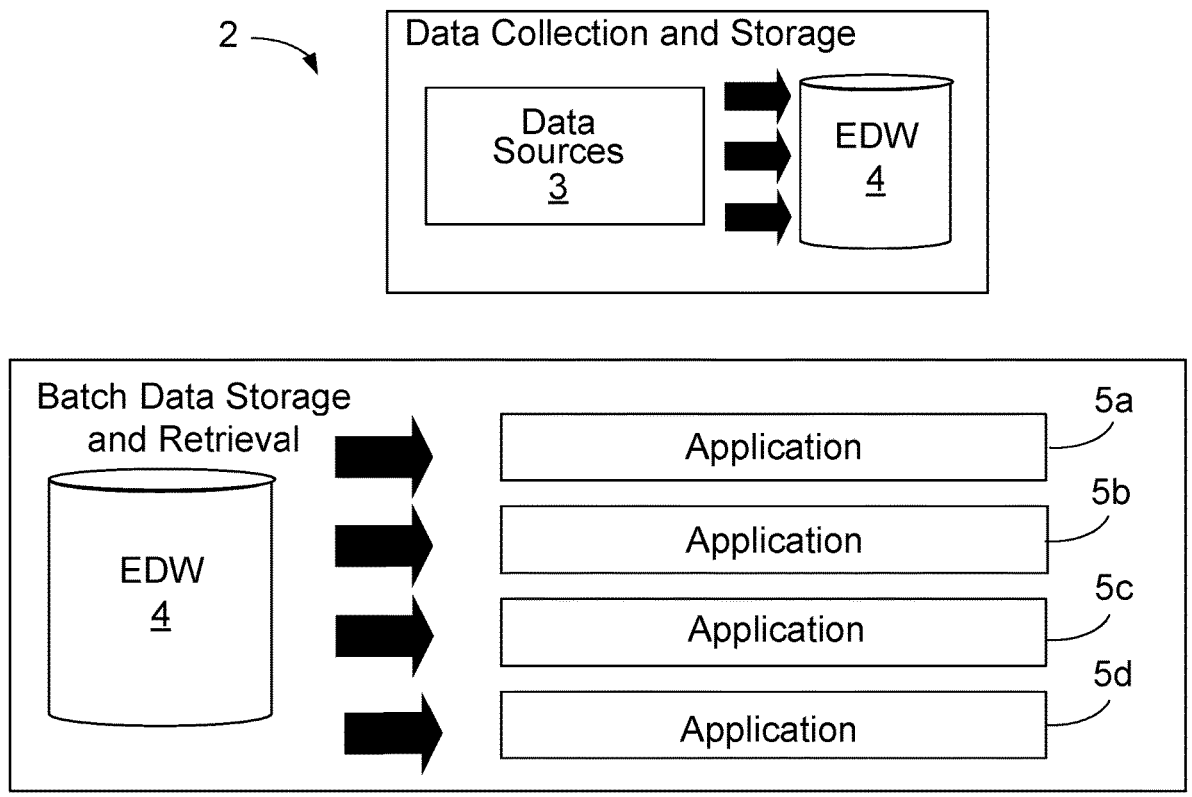
FIG. 1A is diagram of different engines acting on batch data in different data streams.

A system consistent with this disclosure intermittently (e.g., periodically or continuously) receives data from various data sources. As the data is intermittently received, the system collects the data into a single data stream (e.g., by multi-publishing the received data to a queue) and joins the data together in near real-time (e.g., in one millisecond, two milliseconds, and so forth) in a single, wide record, e.g., by generating a wide record that includes the data multi-published to the queue. The data is collected in near real-time from the data sources, rather than being retrieved (in batch) from a data warehouse. This collected data includes events, including, e.g., a record that includes data indicative of an occurrence of an action (e.g., the making of a voice call or a length of a voice call) or data indicative of an occurrence of an action. By joining together the data from these various data sources, the wide record includes different types of events (e.g., Short Message Service (SMS) events, voice events, data events, and so forth). The system enriches this wide record with event aggregations, nonevent data, state data and various dimensions, such as customer data (e.g., a customer profile), account data, and so forth. Generally, a dimension includes data pertaining to an entity (e.g., a customer, a dealer, and so forth) associated with an event. Generally, an event aggregation includes data indicative of an amount of an event that has occurred in the aggregate over a specified period of time. Generally, nonevent data includes data indicative of a non-occurrence of an event. For example, nonevent data may specify an amount of time since a user last sent a text or SMS message. Generally, state data includes data indicative of a state (e.g., a progression) of a particular application (e.g., a campaign), implementation or execution.

The system enables execution of multiple, different applications operating at multiple levels (e.g., a subscriber (customer) level, a dealer (retailer) level, and so forth) against the single wide record, rather than each application, level type being executed against data retrieved in batch from a data repository. In this example, each of these levels represents a particular type of entity, such as a mobile device subscriber, a mobile device dealer, and so forth. To build these "any event" applications, the system includes an event palette, which includes an interface for a user (e.g., a user) to access and to view a collection of pre-defined events, event aggregations, nonevents and application states that may be used (e.g., by a rules environment including a user interface for rules) in defining a series of rules (e.g., rules). That is, the event palette specifies a particular arrangement of events and data so that the user interface for rules can be used to allow appropriate rules that are include or are based on these events to be authored. For example, the event palette may be used (e.g., by the rules environment for defining rules) to define a rule for a program that specifies that when a customer has sent twenty SMS messages to provide the customer with a five dollar credit. In this example, the user may use an event aggregation for SMS messages in defining the rule. Because the event palette includes a set of events and event aggregations that are available for various types of applications operating at various levels and different types of events, a user can use the event palette to build multiple, different types of applications that each span multiple types of events. In this example, the system generates an event record that includes values for all the events (or at least a portion of the events) defined in the event palette. In an example, the values of events defined in the event palette are included in sub-records (e.g., a record included in a record) in the event record. For example, the event palette defines subscriber profile events, which are stored in a profile sub-record in the event record. In an example, the event record is a wide record of all events included in the event palette. In this example, the event record includes a data record with items of data.

By executing an application against a pre-populated (or pre-produced) event record, the system provides for faster processing of applications in real-time and with real-time data, relative to processing time if the system had to retrieve from a data warehouse or database the data against which the application is executed. This process of producing the event record results in denormalization of data, in which the same data is purposefully spread across multiple records (e.g., the event records, database records storing the data and so forth). The denormalization of the data provides for increased processing speed for application execution, as the system no longer needs to execute a database query to retrieve the data.

To enable real-time execution of an application including events in the event palette against real-time data streams, the system produces a wide record of all the events in the event palette to decrease a latency associated with having to perform database queries for relevant data as the application is executed and to decrease a latency associated with performing enrichments during application execution (e.g., calculating aggregations during application execution). Rather, for each event received in the real-time data stream, an event record is pre-built that includes the complete event palette and enrichments (such as real-time aggregations) and the event record is published to a queue for application execution, thereby generating multi-event, any event applications with low latency and enabling the application to execute independent of database queries and lookups. Additionally, through generation of this single record (e.g., the wide record) that includes all events (associated with a particular key or identifier), the system provides for increased flexibility, as the record can be applied to all the engines and applications, rather than have to do a database query and retrieval for each application. In an example, this key or identifier includes a user identifier (ID) key). In this example, the system collects and groups together all events for a particular user, based on user ID keys. Additionally, this system provides for increased flexibility, as the engines do not need to be preconfigured to retrieve particular types of data from an EDW and/or to query particular fields in records in an EDW. Rather, the system generates the wide record (that includes all events associated with a particular key, e.g., such as the above described user ID key) and can then execute the applications or engines against the data in the wide record, enabling the application execution to be "on the fly" based on that data included in the wide record.

Figure 1B:
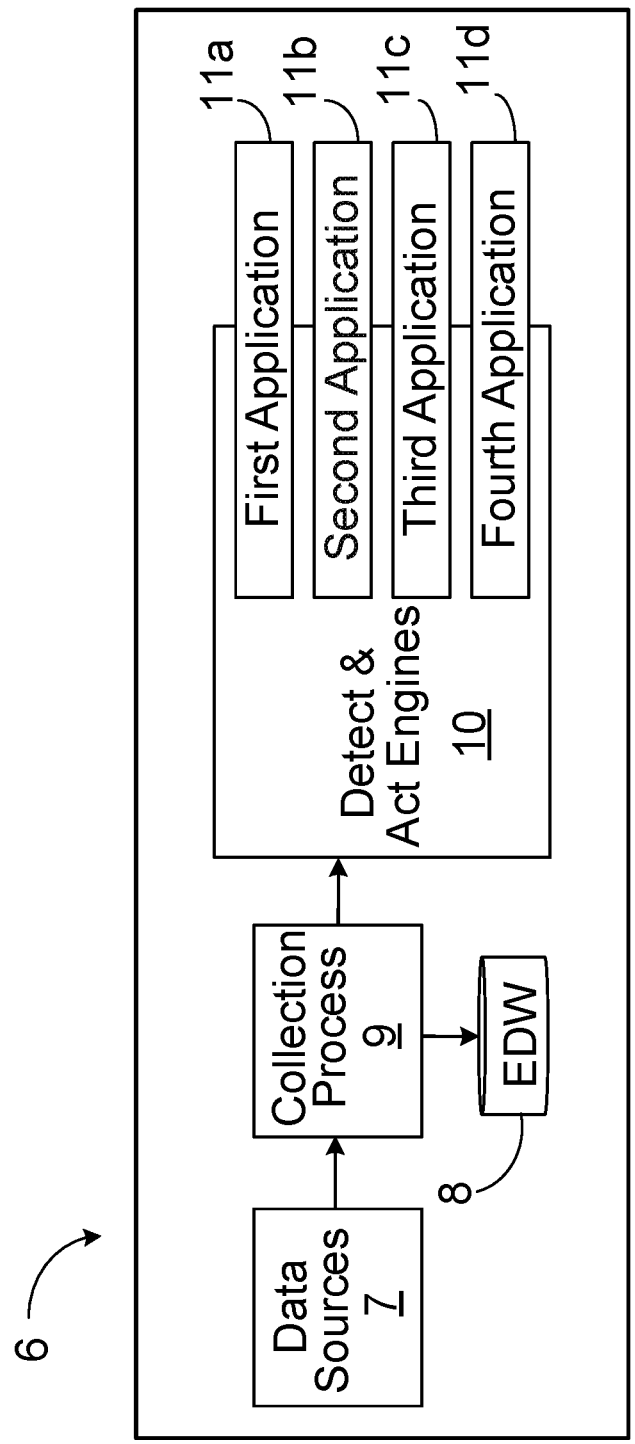
FIG. 1B is a diagram of one engine implementing various applications and acting on batch and real-time data.

Referring to FIG. 1B, system 6 receives data from data sources 7 (e.g., data sources distributed in a network) and implements collection process 9 to collect the data into a single data stream, e.g., by multi-publishing the data to a queue. From the data multi-published to the queue, system 6 generates a wide record of events included in the data, as described in further detail below. In this example, system 6 collects the data in near real-time, as the data is received from data sources 7 (e.g., data sources related to logistic hubs, distributed machinery, mobile communications or retail stores). As part of the collection, system 6 stores the data (or a portion of the data) in EDW 8. The collection of the data itself occurs in near real-time data, as the data is received from data sources 7, e.g., rather than being subsequently retrieved from a data warehouse. Because the wide record is generated from this collected data (rather than being generated from data retrieved from a data warehouse), the wide record is generated and updated in near real-time, as the data is collected. System 6 also includes detect and act engines 10 for applying rules to the collected data (e.g., the data in the wide record), detecting that one or more portions of the collected data satisfy of one or more conditions of the rules and performing appropriate actions. In this illustrative example, detect and act engines 10 execute rules for applications 11a, 11b, 11c, 11d, which are different types of applications. Each of applications 11a, 11b, 11c, 11d may be implemented as dataflow graphs that are configured using an environment for defining rules. Because detect and act engines 10 execute against a single wide record, detect and act engines 10 are able to implement various, different applications 11a, 11b, 11c, 11d against one data stream (e.g., the wide record), rather than having different engines execute against different data streams that are appropriate for each of the different applications.

Figure 1C:
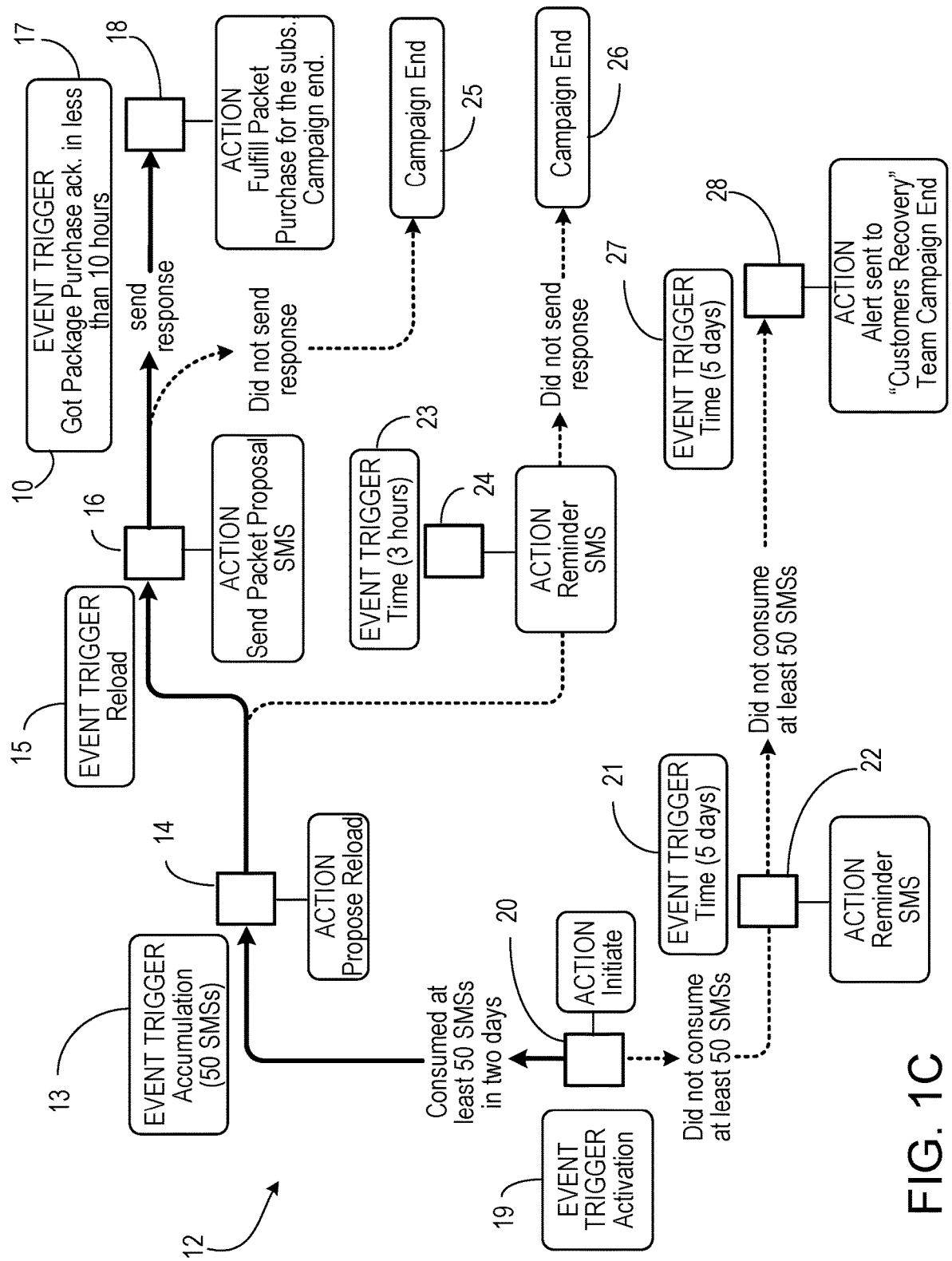
FIG. 1C is a diagram of real-time execution with a wide record.

Referring to FIG. 1C, event-based application 12 uses a wide record generated using the above-described techniques in its execution. In this example, application 12 specifies various event triggers and actions, based on events included in the event record for one or more particular subscribers. Application 12 includes various decision points (e.g., "did a subscriber consumer fifty SMS messages?"). For a particular subscriber for whom the application is expecting, detect and act engines 10 decide which branch of application 12 to traverse based on the events (or lack thereof) included in the event record for the subscriber and based on a subscriber's state in the application (e.g., "application state"). Generally, application state refers to a particular component (for example, a particular event trigger or a particular action) to which a subscriber has transitioned during execution of the application. For example, application state specifies which event trigger or action in an application is currently being executed for a particular subscriber. In some examples, detect and act engines 10 wait for specified periods of time before selecting a branch in application 12. By waiting for these specified periods of time, detect and act engines 10 analyze new events that are inserted into the event records.

In this example, application 12 includes event trigger 19 that specifies that upon activation of service for a particular subscriber, detect and act engines 10 perform initiation action 20 of monitoring an amount of SMS messages consumed by the particular subscriber in two days. In this example, event trigger 19 is a condition precedent of a rule being executed by application 12. Upon satisfaction of event trigger 19, detect and act engines 10 execute initiation action 20. Detect and act engines 10 determine when a particular subscriber satisfies event trigger 19 by detecting an activation event in the wide record and determines a subscriber (via subscriber ID) associated with the activation event.

In this example, when the subscriber has consumed at least fifty SMS messages in the last two days (e.g., as specified by a SMS usage event aggregate in the event record), event trigger 13 is executed. Event trigger 13 executes proposed reload action 14, which causes detect and act engines 10 to prompt this particular subscriber to reload. When the subscriber does perform a reload, the entry in the event record for that particular subscriber is updated with an event representing the reload. This updating of the event record causes application 12 to execute event trigger 15, which specifies that upon successful reload to execute action 16 to send a packet proposal SMS to the subscriber. Generally, a packet proposal is a proposal to purchase a package or bundle service.

When the user sends a response to the package proposal SMS, the event record is updated with an event that represents the response and that represents the response being received in less than three hours. Detect and act engines 10 detect the update in the event record and cause event trigger 17 to execute. Event trigger 17 specifies that when the response is received in less than ten hours to execute action 18 of ending the application (for that particular subscriber), as the subscriber as fulfilled the package purchase. When the entry for the particular subscriber in the event record specifies that the particular subscriber did not send a response to action 16, application 12 also specifies action 25 of ending the application for that particular subscriber.

In an example, the entry for the particular subscriber in the event record specifies that the subscriber did not perform a reload, e.g., via an absence of a reload event or via a derived event that specifies an absence of the reload. In this example, application 12 specifies event trigger 23 of waiting for three hours, e.g., to monitor whether the user performs the reload in the next three hours. After the three hours, event trigger 23 causes reminder action 24 to be performed of sending a reminder SMS to reload to the subscriber. If the subscriber does not respond to the reminder SMS, application 12 specifies action 26 of ending the application for that particular subscriber.

In response to action 20, an entry for the particular subscriber may specify that the subscriber did not consume at least fifty SMSs in the last two days. The entry may specify this via a derived event that specifies a lack of consumption of fifty SMSs or via a SMS usage aggregate event that specifies that the consumption was less than fifty SMSs. In this example, application 12 includes event trigger 21 of waiting five days and then implementing action 22 of sending a reminder SMS. If after sending the reminder, the subscriber still has not consumed fifty SMSs within another five days (e.g., as specified by events for that subscriber in the event record), application 12 specifies event trigger 27 of performing action 28 of sending an alert to the a customer recovery team (e.g., to notify the team that the consumer is not using the service) and ending the application for that particular subscriber.

Figure 2:
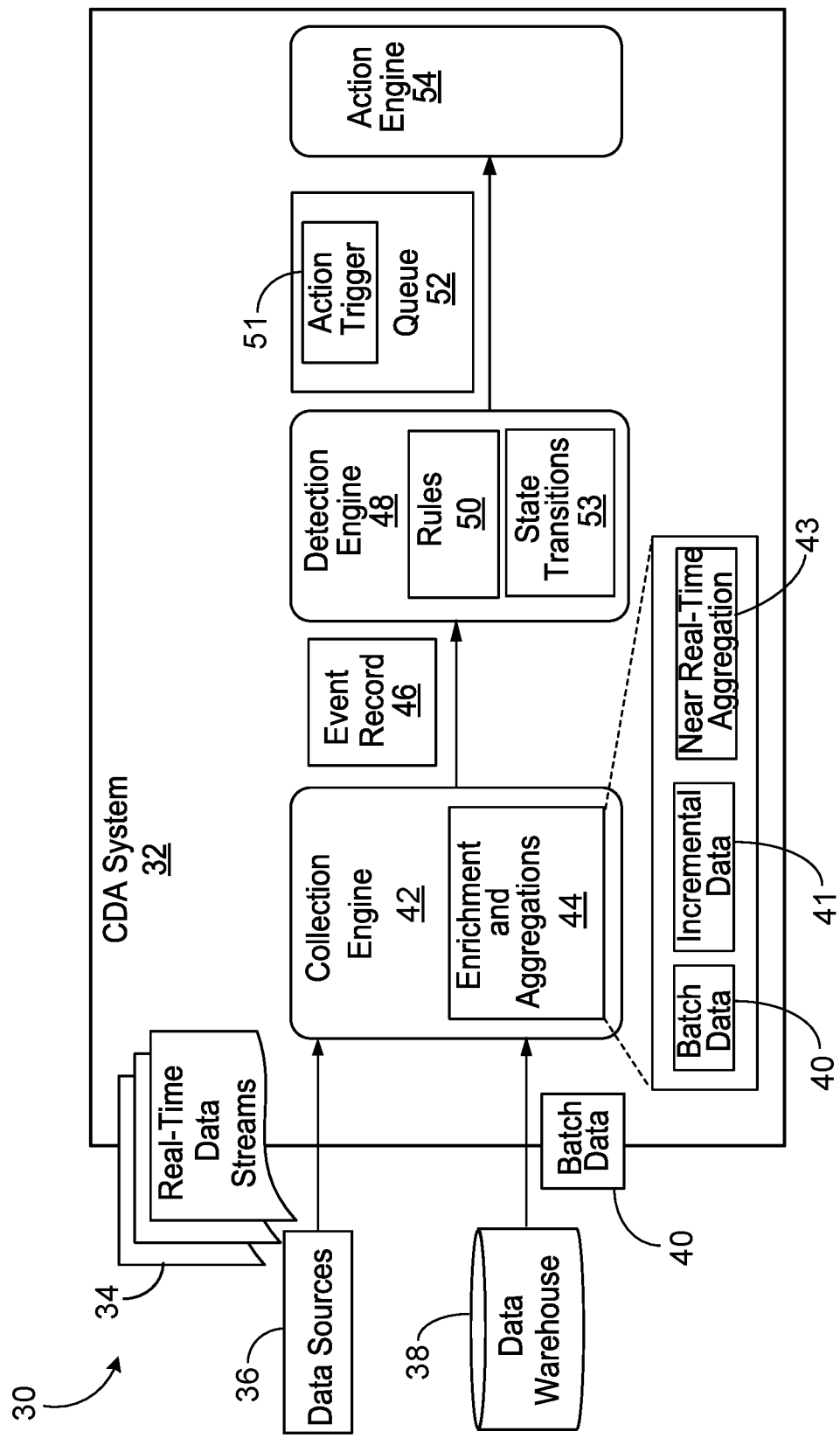
FIG. 2 is a diagram of a system for computing near real-time event aggregates.

Referring to FIG. 2, environment 30 generates a wide record of different types of events, in near real-time, as the events are received. In this example, environment 30 includes Collect Detect Act (CDA) system 32 for collecting events, detecting satisfaction of one or more predefined conditions (as specified in rules) in the events and performing appropriate actions for the detected events. In this example, CDA system 32 is also a search and retrieval system for searching data records in data warehouse 38 (and/or in memory in CDA system 32) to retrieve batch data 40 and also to retrieve profile data, e.g., that is used to enhance the received real-time data. In an example, CDA system 32 processes over two billion events per day for fifty million subscribers and computes aggregates for each of the event types. In this example, CDA system 32 receives real-time data streams 34 from data sources 36. As used herein, real-time includes, but is not limited to, near real-time and substantially real-time, for each of which there may be a time lag between when data is received or accessed and when processing of that data actually occurs, but the data is still processed in live time as the data is received. From real-time data streams 34, CDA system 32 intermittently receives data that include events. The received data also include different types of events. In an example, a first one of real-time data streams includes data representing a first type of event and a second one of real-time data streams includes data representing a second type of event. CDA system 32 includes collection engine 42 for collecting the different types of events received in real-time data streams 34. Because collection engine 42 acts on real-time events, rather than data extracted from an EDW, CDA system 32 is able to provide an immediate response to events (as they are received) and to the near real-time aggregation of events, which also provides for immediate visibility of application results. Collection engine 42 collects the events into a single data stream and multi-publishes the events to queue. In an example, collection engine 42 collects the events by using continuous flows to continuously process the received events, as described in U.S. Pat. No. 6,654,907, the entire contents of which are incorporated herein by reference.

As events from real-time data streams 34 continue to be intermittently received by collection engine 42, collection engine 42 detects (e.g., in the queue) two or more particular events that share a common quality, such as being included in the event palette or being associated with a particular user attribute (e.g., a user identifier (ID), a user key, and so forth). In an example, the common quality is corresponding values for a particular field (e.g., a user ID field) of the two or more particular events, the two or more particular events being of a specified event type and/or the two or more particular events being defined by the event palette.

Collection engine 42 creates a collection of events that include the detected two or more particular events. In this example, collection engine 42 generates event record 46 that includes the collection of the detected events. Collection engine 42 also inserts enrichments and aggregations 44 into event record 46, e.g., a wide record. Generally, an enrichment is data that is stored in a data warehouse (having been previously received or precomputed) that is related to an event. For example, an event may specify a number of SMS messages a user has sent and may also include a user ID for that user. In this example, data warehouse 38 stores data that includes (or is associated with) the same user ID. This stored data includes user profile data that includes, e.g., the latest handset type of the user. Collection engine 42 attaches to or inserts into event record 46 customer profile data for a customer associated with a particular event included in event record 46.

Collection engine 42 also computes one or more aggregations (i.e., event aggregations) for one or more of the events included in event record 46. For a particular event for a particular user (as specified by the user ID included in the event), collection engine 42 retrieves, from data warehouse 38, batch data 40 for that particular event for that particular user. Batch data 40 includes a historical aggregation related to the particular event, with the historical aggregation being a pre-computed aggregation of event data from a prior time period, e.g., a period from a starting time to a particular time prior to performance of detecting events. Generally, event data includes data indicative of a particular quality, attribute or characteristic of an event (e.g., an amount of data usage for a data usage event). For example, a quality of an event includes a particular field (that is included in the event), a particular value of a field included in the event, a particular user ID key included in or associated with an event, an absence of a particular field or value of the particular field for the event, and so forth. Based on data included in real-time data stream 34 for the particular event for the particular user and on the historical aggregation, collection engine 42 computes combined event data, e.g., a near real-time aggregation for the event. Collection engine 42 enriches event record 46 with the combined event data for the at least one particular event.

In an example, one of the events in event record 46 is data usage for John Doe, associated with User ID 5454hdrm. In this example, collection engine 42 retrieves, from data warehouse 38, batch data 40 for the event of "data usage" that is associated with user ID 5454hdrm. To compute a near real-time aggregation for this event for this particular user, collection engine 42 aggregates batch data 40 with incremental data 41 to compute near real-time aggregation 43 for this event.

In this example, incremental data 41 includes a portion of the data received from real-time data streams 34 that pertains to the event type being aggregated for that particular user. Incremental data 41 occurs from a time at which the historical aggregation was last computed to a near present time, e.g., when near real-time data streams are received. For example, batch data 40 specifies that user John Doe has used sixty-five megabytes of data in the last month and incremental data 41 specifies that user John Doe has used 1 megabyte of data in the last five minutes. By aggregating batch data 40 with incremental data 41, collection engine 42 computes near real-time aggregation 43 for this particular data usage event for customer John Doe. Collection engine 42 inserts near real-time aggregation 43 into event record 46, e.g., as part of the record for this particular event for this particular user. Collection engine 42 also attaches to event record 46 an appendable lookup file (ALF) with the historical aggregation for the particular event, e.g., as specified by batch data 40. Collection engine 42 attaches the ALF with the historical aggregation to promote use of the historical aggregation in computing new near real-time aggregations, e.g., as new events are received.

In this example, collection engine 42 transmits event record 46 to detection engine 48. Detection engine 48 includes rules 50, including, e.g., rules for implementing various, different applications for different types of entities. Detection engine 48 includes a single engine for implementing the various applications and applications. In this example, CDA system 32 receives, from a client device of a user, data representing one or more rules defining an application. For example, the user may use the event palette to define the rules. CDA system 32 generates, based on the received data, the one or more rules that define the application. CDA system 32 passes these one or more rules to processes configured to implement the one or more rules, e.g., detection engine 48. Detection engine 48 implements an application based on execution of rules 50 against event record 46. Detection engine 48 also includes state transitions 53, including, e.g., data specifying a state in an application to which a user has transitioned or progressed. Based on state transitions 53, detection engine 48 identifies which actions in an application are executed and/or which decision branches in the application to execute. For example, based on a particular subscriber's state in an application-as specified by state transitions 53 for that subscriber-detection engine 48 identifies which component of an application have already been executed and which component of the application to execute next, in accordance with the subscriber's application state.

Event record 46 includes different types of events, such as SMS events, voice events, data events, and so forth. Accordingly, rules 50 include rules with conditions for the various, different types of events. Generally, a rule includes a condition, satisfaction of which causes execution of an action. In this example, one rule ("Rule 1") may have a condition of a user having sent thirty SMS messages in the last sixth months. Upon satisfaction of this condition, Rule 1 specifies an action of issuing the user a credit of $5. Another rule ("Rule 2") may have a condition of a user having used less than fifty megabytes of data over the last month. Upon satisfaction of this condition, Rule 2 specifies an action of offering the user a usage discount, e.g., to incentivize increased data usage. In this example, both Rule 1 and Rule 2 use different types of events (i.e., SMS events and data events, respectively). Detection engine 48 is able to execute a program that includes rules that are dependent on different types of events, because event record 46 is a single wide record that includes different event types. Additionally, detection engine 48 is a single engine that executes applications for multiple, different applications, because detection engine 48 receives event record 46 which includes all event types for all different operating levels. That is, detection engine 48 is configured to execute a plurality of different applications against a single wide record, i.e., event record 46, rather than having different engines executing different applications against different event records (that each include the type of data appropriate for a respective application).

Upon detection of an event (or an aggregation of events) in event record 46 that satisfies at least one of the conditions in rules 50, detection engine 48 publishes action trigger 51 to queue 52 for initiation of one or more actions (e.g., that are specified by the rules with the satisfied conditions). In an example, the action trigger includes data specifying which actions to execute, which application they are being executed for and a user (e.g., a subscriber or a dealer for whom the action is executed). Detection engine 48 transmits queue 52 to action engine 54 for execution of the action specified in action trigger 51. In this example, action engine 54 is configured to execute various actions, such as issuing of credits to user accounts, transmitting messages, transmitting discount messages, and so forth.

Typically, data collected from data streams does not include all the information needed by a CDA system for processing, such as user name and profile information. In such cases, the data (i.e., the data collected from the data streams) is enhanced by combining the profile data with the received data in the real-time data stream and by computing near real-time aggregates. By combining the profile data with data from the real-time data stream and by computing the near real-time aggregates, the search and retrieval system generates meaningful data records (e.g., that include the received near real-time data associated with a key, the profile data for that key and the near real-time aggregates for that key) tailored to the processing requirements of the search and retrieval system. Generally, the processing requirements include the various operations to be performed (and/or rules to be executed) by the system and various data required for performance of those operations. Additionally, this precomputation or generation of a data record that includes "all events" or fields that are pre-populated with data corresponding to each of the events in the event record (and/or a predefined set of fields) helps avoid and reduce congestion in network bottlenecks, e.g., at a time of processing the real-time data streams. This is because all the data required for processing is included in a single record (e.g., a record of records), e.g., thus eliminating or reducing data retrieval, computation and database queries at each stage or step in processing a data record or a collection of records. Additionally, by saving much of the enhancement data (e.g., profile data) in memory or in a cached index in the CDA system, the system is able to more quickly access that data, as it generates the pre-computed record (of records).

For example, the system described herein is configured to load into memory (or into an indexed cache) the enrichments and enhancement data at times when the system is under a decreased load, e.g., relative to the load at other times. Because the system has the flexibility to pre-load the enhancement data at times when the system is otherwise under decreased load, the system enables load distribution— by loading the enhancement data into memory at times of decreased load, e.g., rather than having to do so in real-time as the processing of the data records occurs (and which would be a period of increased load).

Figure 3:
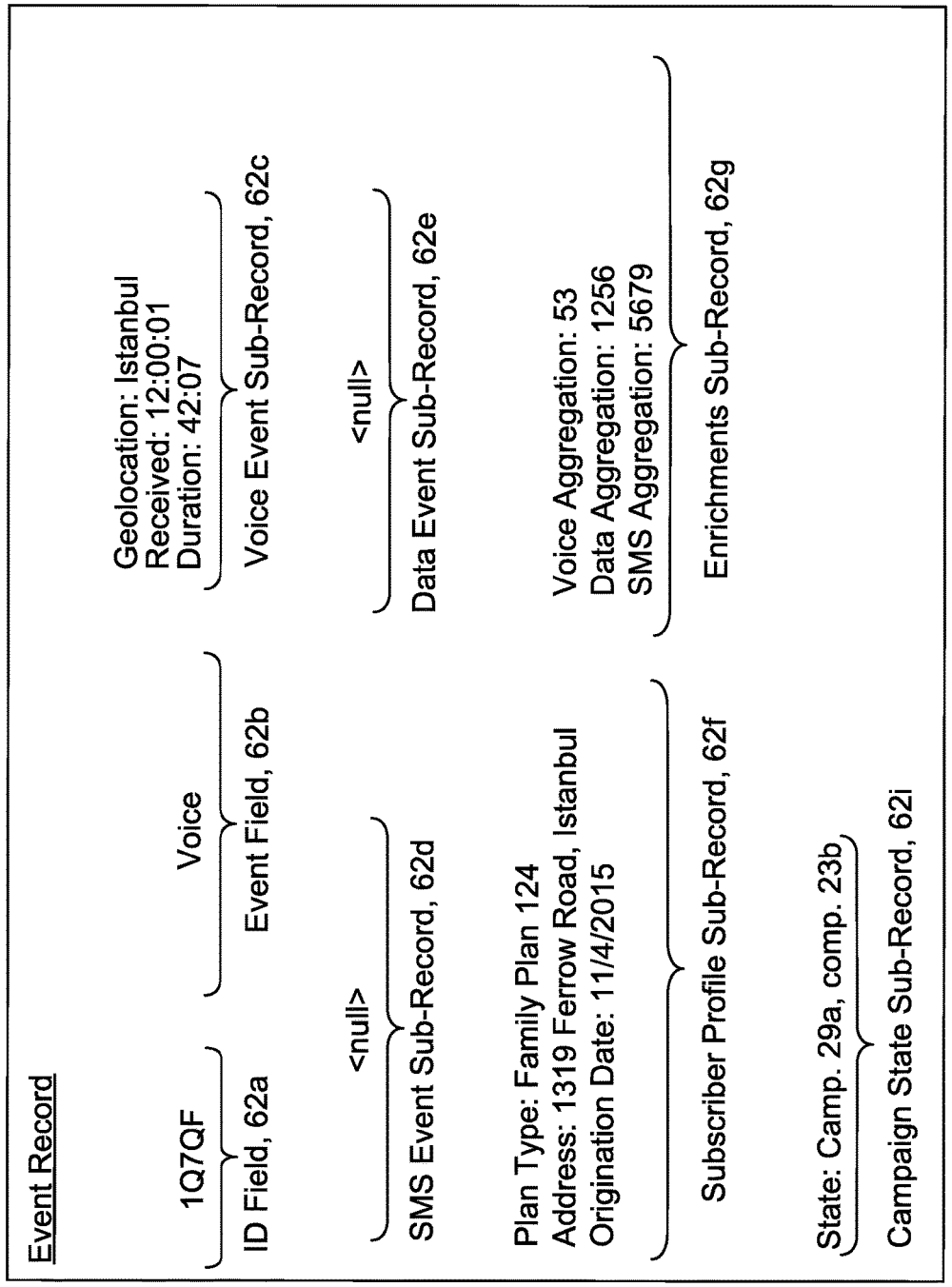
FIG. 3 is an example event record.

Referring to FIG. 3, event record 60 includes fields 62a, 62b and sub-records 62c-62i. In a variation, each sub-records 62c-62i is a field for insertion of a record (or a portion thereof). In this example, event record 60 includes an enhanced data record, e.g., that includes the received near real-time data associated with a key, the profile data for that key and the near real-time aggregates for that key. Generally, a sub-record is a record within a record. As such, the sub-record itself includes a plurality of fields. In this example, event record 60 includes all the fields and/or sub-records that are processed and analyzed by the system, e.g. in performing event detection.

In this example, event record 60 includes ID field 62*a* for a subscriber ID that uniquely identifies a subscriber associated with the event being represented by this event record. Event record 60 also includes event type field 62*b* to specify the type of event detected in the near real-time data streams for which this event record is produced. There are various different types of events, for example, data events, voice events, SMS events, and so forth. In this example, the event type is a voice event of the subscriber, e.g., as specified in the most recently received data. In this example, CDA system 32 receives real-time data streams 34 and detects in real-time data streams 34 a voice event for a subscriber associated with a particular subscriber ID. In response, CDA system 32 generates event record 60 and inserts the detected subscriber ID (e.g., subscriber ID of "1Q7QF" is inserted into ID field 62*a*) and inserts data specifying the detected type of event (e.g., voice event) into event type field 62*b*. In this example, the voice event includes data indicative of current voice usage by the subscriber. In this example, the data indicative of the subscriber voice usage is incremental data, as it represents an incremental amount of usage for this particular event (e.g., an amount of voice usage for the particular event for this particular entity from a present time to when the data for this event was previously stored in batch in data warehouse 38).

Event record 60 includes voice event sub-record 62*c* with fields for storing data specifying qualities or characteristics of the voice event itself, such as, geolocation in which the voice event occurred (e.g., geolocation: Istanbul), a time in which the voice event was received (e.g., time received: 12:00:01), and the duration of the voice even (e.g., duration: 42 minutes: 07 seconds).

Event record 60 also includes event sub-records for the other types of events (e.g., SMS and data events), even when these other types of events are not detected. In this example, event record 60 includes SMS event sub-record 62*d* and data event sub-record 62*e*, each of which have values of "null" to specify that these types of events are not included in the detected event for which event record 60 is generated. However, event record 60 includes SMS event sub-record 62*d* and data event sub-record 62*e* to build a complete record of the status of all event types at the particular point in time in which event record 60 is generated.

Event record 60 also includes subscriber profile sub-record 62*f* for insertion of a subscriber profile. In this example, CDA system 32 retrieves from data warehouse 38 a subscriber profile for the subscriber represented by the subscriber ID included in ID field 62*a*. CDA system 32 inserts the retrieved subscriber profile (e.g., a dimension for the event) into fields in subscriber profile sub-record 62*f*. In this example, subscriber profile sub-record 62*f* includes a plan field, and address field, and an origination date field, as shown in the illustrative example of FIG. 3.

Event record 60 also includes enrichments sub-record 62*g* for insertion of various enrichments and event aggregations. In this example, enrichments sub-record 62*g* includes near real-time voice, data and SMS aggregations. In this example, the voice aggregation is based on a historical (e.g., batch) aggregation of voice usage for this particular user and incremental voice usage, e.g., as specified in the duration field of voice event sub-record 62*c*. The data aggregation is based on batch data specifying historical data usage and incremental data usage for that day as stored in memory of CDA system 32, rather than being committed to an EDW. The SMS aggregation is based on batch data specifying historical SMS usage and incremental SMS usage for that day as stored in memory of CDA system 32. In an example, data received in real-time data streams is stored in memory (e.g., of CDA system 32) and then committed to EDW storage at specified time intervals, e.g., at the end of the day. In determining data aggregation for enrichments sub-record 62*g* of event record 60, CDA system 32 aggregates the batch data with the incremental data (specifying data usage for the particular subscriber) that is in memory. Even though event record 60 is produced for a voice event, enrichments sub-record 62*g* is still populated with data and SMS aggregations, as these aggregations may be necessary for execution of an application (e.g., when certain components of an application have a condition for execution that is based on data and/or SMS aggregations).

Event record 60 also includes application state sub-record 62*i* specifying a state in an application to which a subscriber has transitioned. In this example, application state sub-record 62*i* includes a state field specifying which application, from among a plurality of different applications, is being executed (i.e., application 29*a*) and which component within that application is being executed (i.e., component 23*b*). In an example, application state is tracked, via sub-record 62*i*. The application state is meaningful to the logic; state is required to implement certain kinds of applications.

Figure 4:
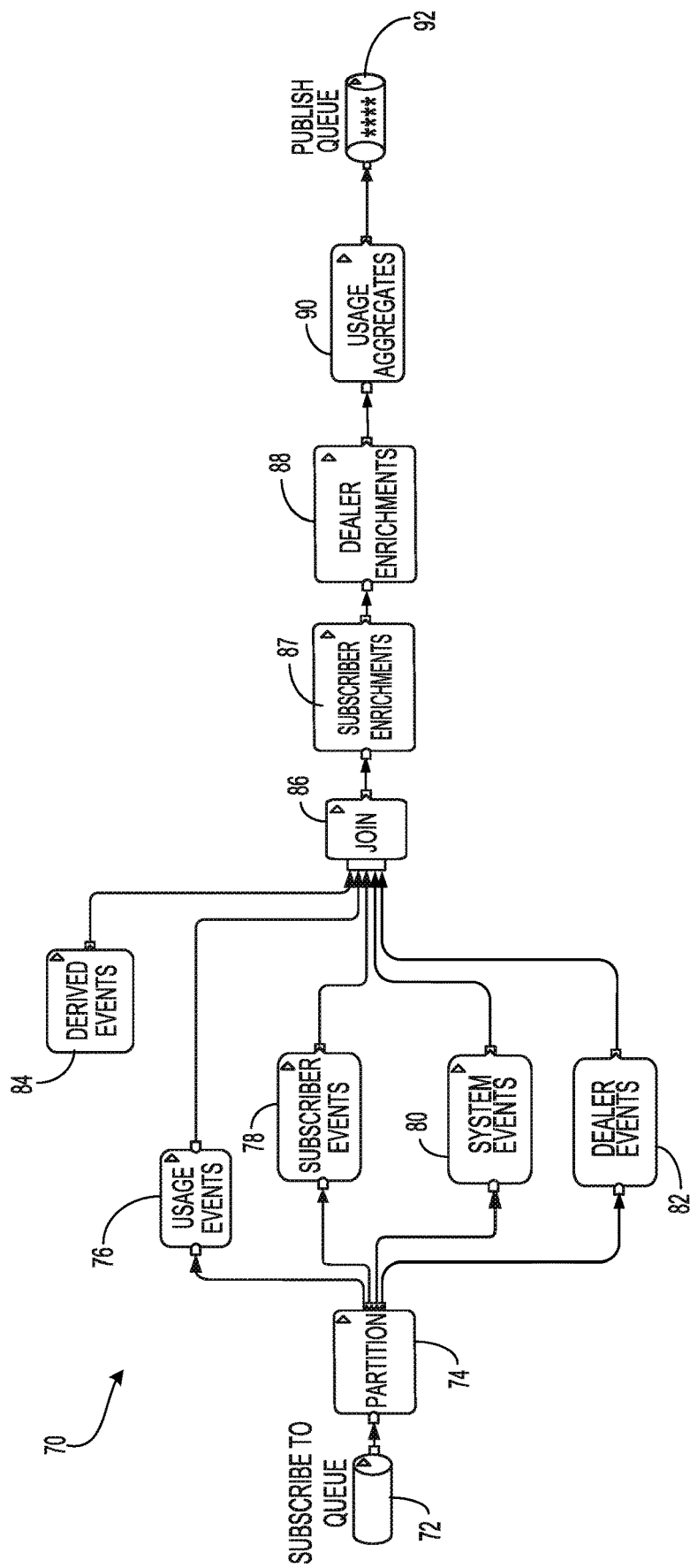
FIG. 4 is a diagram of a dataflow graph.

Referring to FIG. 4, dataflow graph 70 executes a process against data items included in a real-time data stream. In this example, CDA system 32 executes dataflow graph 70 in generating an event record, such as event record 60, and in enriching the event record with profile data and with aggregates. The dataflow graph 70 has a plurality of graph components, representing a plurality of data processing entities (e.g., one or more CPUs), connected by one or more links representing data flows between the data processing entities. Dataflow graph 70 includes subscribe component 72 that subscribes to (e.g., receives data from) a source data reader or a plurality of source data readers. Through subscribe component 72, dataflow graph 70 accesses, in real-time, items of data included in a real-time data stream. In this example, subscribe component 72 receives a real-time data steam (e.g., including thousands of records) from a data queue (e.g., that may perform some initial processing on the data stream to ensure its readability). Data flows from subscribe component 72 to partition component 74, which partitions or divides the data items (which include events) received in the data flows by event types. In this example, partition component 74 is configured to detect the different types of events defined in the event palette and partitions the various types of events to other components that are configured to process a particular type of event.

In this example, dataflow graph 70 includes usage events component 76, events component 78, system events component 80, and events component 82. Data flows from partition component 74 to one or more of events component 76, events component 78, system events component 80, and events component 82.

Usage events component 76 includes operations for processing usage events, including, e.g., events specifying an amount of SMS usage, voice usage, data usage and so forth. These operations identify which portion of a record including an event includes data specifying the usage amount and which portion(s) of the record include other types of data, such as data specifying a user ID or other types of data that uniquely identify a user.

In this example, subscriber events component 78 includes operations for processing subscriber events, including, e.g., events pertaining to a customer or a subscriber. There are various types of subscriber events, including, e.g., activation events (i.e., when did a user activate a mobile device), location events (i.e., a geographic location from which a user uses a mobile device), and so forth. These operations included in the subscriber events component 78 analyze the records including the subscriber events to identify which portion of a record includes the subscriber event and which portion of the record includes identifying user data.

System events component 80 includes operations for processing system events, including, e.g., events pertaining to users' interactions with a system. There are various types of system events, including, e.g., events specifying subscriber days of silence, subscriber fulfillment responses, and so forth. These operations included in the system events component 80 analyze the records including the system events to identify which portion of a record includes the system event and which portion of the record includes identifying user data, in preparation for inserting this data into a wide record.

Events component 82 includes operations for processing a particular type of event, including, e.g., events pertaining to a detailer or a retailer. There are various type of dealer events, including, e.g., events specifying dealer sales, products sold and so forth. These operations included in the events component 82 analyze the records including the events to identify which portion of a record includes the event and which portion of the record includes identifying data, in preparation for inserting this data into a wide record.

Dataflow graph 70 also includes derived events component 84 that includes operations for identifying derived events. Generally, a derived event includes an event that is derived from other data and/or is derived from an occurrence or an absence of an occurrence. There are various types of derived events, including, e.g., events specifying a number of voice days of subscriber silence, a number of SMS days of subscriber silence, a number of data days of subscriber silence, and so forth. In this example, derived events component 84 includes operations to determine these derived events. In an example, CDA system 32 determines these derived events by detecting an absence of a particular type of event (e.g., SMS usage) for a particular user in the events received in the real-time data stream. Upon detection, CDA system 32 determines whether there has been an absence of that particular event for a threshold period of time to detect a presence of a derived event. To determine whether there has been the absence for the threshold period of time, CDA system 32 retrieves from a data repository data for that particular user, including, e.g., data specifying a previously occurring event. When there has been an absence of that particular event for a threshold period, CDA system 32 detects a derived event. In this example, CDA system 32 detects derived events for one or more of the users (e.g., subscribers, dealers, etc.) based on the data (or lack thereof) in the incoming real-time data streams and based on other data (events) stored in a data repository.

In this example, dataflow graph 70 includes join component 86 that implements a join operation. The "join" operation combines various types of data, for example, events from event components 76, 78, 80, 82, 84. In this example, data flows from event components 76, 78, 80, 82, 84 to join component 86, which joins the events together in a wide record. In this example, each of event components 76, 78, 80, 82, 84 send, to join component 86, an event in association with data that uniquely identifies an entity associated with the event, such as a user ID for the entity.

In this example, data flows from join component 86 to subscriber enrichments component 87, which includes operations for enriching the wide record with profile data for a particular type of entity, i.e., a subscriber. In this example, the data that flows from join component 86 to subscriber enrichments component 87 is data specifying which events in the wide record are subscriber events and user IDs associated with the subscriber events, e.g., to enable a look-up of subscriber profiles for those subscribers. For a particular event included in the wide record, operations included in subscriber enrichments component 87 use the user ID for that event to retrieve (from a data repository) profile data for a user specified by the user ID. Subscriber enrichments component 87 inserts the retrieved profile data into the wide record, e.g., in association with the event.

Data flows from enrichments component 87 to enrichments component 88, which includes operations for enriching the wide record with profile data for another particular type of entity, i.e., a dealer. In this example, the data that flows from enrichments component 87 to enrichments component 88 is data specifying which events in the wide record are particular types of events and user IDs (i.e., dealer IDs) associated with a particular entity (associated with those particular types of events), e.g., to enable a look-up of profiles associated with that entity. Various types of data are included in a profile, including, e.g., data specifying whether or not the entity is a preferred vendor, whether or not the entity is part of a chain, and, if so, which one, and so forth. For a particular event included in the wide record, operations included in enrichments component 88 use the user ID for that event to retrieve (from a data repository) profile data for a dealer specified by the user ID. Enrichments component 88 inserts the retrieved profile data into the wide record, e.g., in association with the event for that entity.

Data flows from enrichments component 88 to usage aggregates component 90, which includes operations for computing near real-time aggregates for various type of events, including, e.g., usage events. For a particular event for a particular user (e.g., subscribers or dealers), usage aggregates component 90 retrieves the batch data for that user (e.g., the data specifying a pre-computed aggregate that is stored in batch) and ads incremental data (e.g., one or more events received in the real-time data stream) to the batch data to compute the near real-time aggregate. Usage aggregates component 90 inserts into the wide record the computed near real-time event aggregate, e.g., for a particular event for a particular user. In an example, usage aggregates component 90 also attaches to the wide record an ALF file with aggregations (e.g., voice aggregations, data aggregations, reload aggregations, and so forth) at various time intervals (e.g., daily, weekly, monthly, and so forth). Generally, a reload is an adding of additional money, minutes and/or data to a prepaid calling or mobile service plan.

In this example, there are various, different types of aggregations, including, e.g., calendar aggregations (e.g., an event aggregation for a day, week, month, etc.), which are calculated mini-batch style (e.g., every N minutes) and added to the wide record. Generally, mini-batch includes a pre-computed aggregation of event data that occurs at specified time intervals (e.g., every N minutes) and is stored (in batch) in a data warehouse. A calendar aggregation in the data warehouse is continuously and/or periodically updated to include the newest mini-batch aggregation for that particular calendar aggregation. Generally, a mini-batch aggregation occurs more frequently than a batch aggregation, which, e.g., may occur every three days, rather than every three minutes in mini-batch aggregation. Because mini-batch aggregations occur more frequently, these types of aggregations aggregate smaller batches of data. There are also windowed aggregations (e.g., an event aggregation for the last minute, last N hours, last N days, etc.) and these are calculated during enrichment as events come in and are also added to the wide record. These windowed aggregations are stored in memory of CDA system 32, rather than being committed to an EDW, and are thus calculated as events arrive in real-time.

Data flows from usage aggregates component 90 to publish component 92, which publishes the wide record, e.g., to a queue to enable multiple, different applications to be executed against the wide record. By publishing the wide record to queue, each of the sub-records (in the wide record) are included as an entry in the queue, as the various applications execute against the queue entries.

In a variation, dataflow graph may not include a join component, e.g., when the various formats from a collect operation are converted into a common payload. In this example, there is no join component as there is no requirement to recognize specific event formats. In an example, dataflow graph 70 also performs window aggregation calculations, and calendar (e.g., batch) aggregations are run externally from Enrichment (e.g., components 87, 88) separately.

In this example, dataflow graph 70 includes vertices (representing data processing components or datasets) connected by directed links (representing flows of work elements, i.e., data) between the vertices. A system for executing such dataflow graphs is described in U.S. Pat. No. 5,966,072, titled "Executing Computations Expressed as Graphs," the entire contents of which are incorporated herein by reference. Dataflow graphs made in accordance with this system provide methods for getting data into and out of individual processes represented by graph components, for moving data between the processes, and for defining a running order for the processes. This system includes algorithms that choose inter-process communication methods from any available methods (for example, communication paths according to the links of the graph can use TCP/IP or UNIX domain sockets, or use shared memory to pass data between the processes).

The processes or methods described in this specification can be executed by a computing system, the computing system including: a development environment coupled to a data storage, wherein the development environment is configured to build a data processing application that is associated with the data flow graph that implements the graph-based computation performed on data flowing from one or more input data sets through the graph of the graph components to one or more output data sets, wherein the data flow graph is specified by data structures in the data storage, the dataflow graph having a plurality of nodes being specified by the data structures and representing the graph components connected by one or more links, the links being specified by the data structures and representing data flows between the graph components; and/or a runtime environment coupled to the data storage and being hosted on one or more computers, the runtime environment including a pre-execution module configured to read the stored data structures specifying the data flow graph and to allocate and configure computing resources for performing the computation of the graph components, the runtime environment including an execution module to schedule and control execution of the computations assigned to the dataflow graph.

Referring now to FIGS. 5-14, various graphical user interfaces displaying various events in the event palette are shown. Each of these events (shown through the event palette) may be included in an event record (in an appropriate field or sub-record). This inclusion of all events in the event record enables a user to define an application based on various events and to run that defined application against an event record (rather than having to query a database for appropriate data), because the event record includes all (or a portion) of the events in the event palette that could be used in defining the application.

Figure 5:
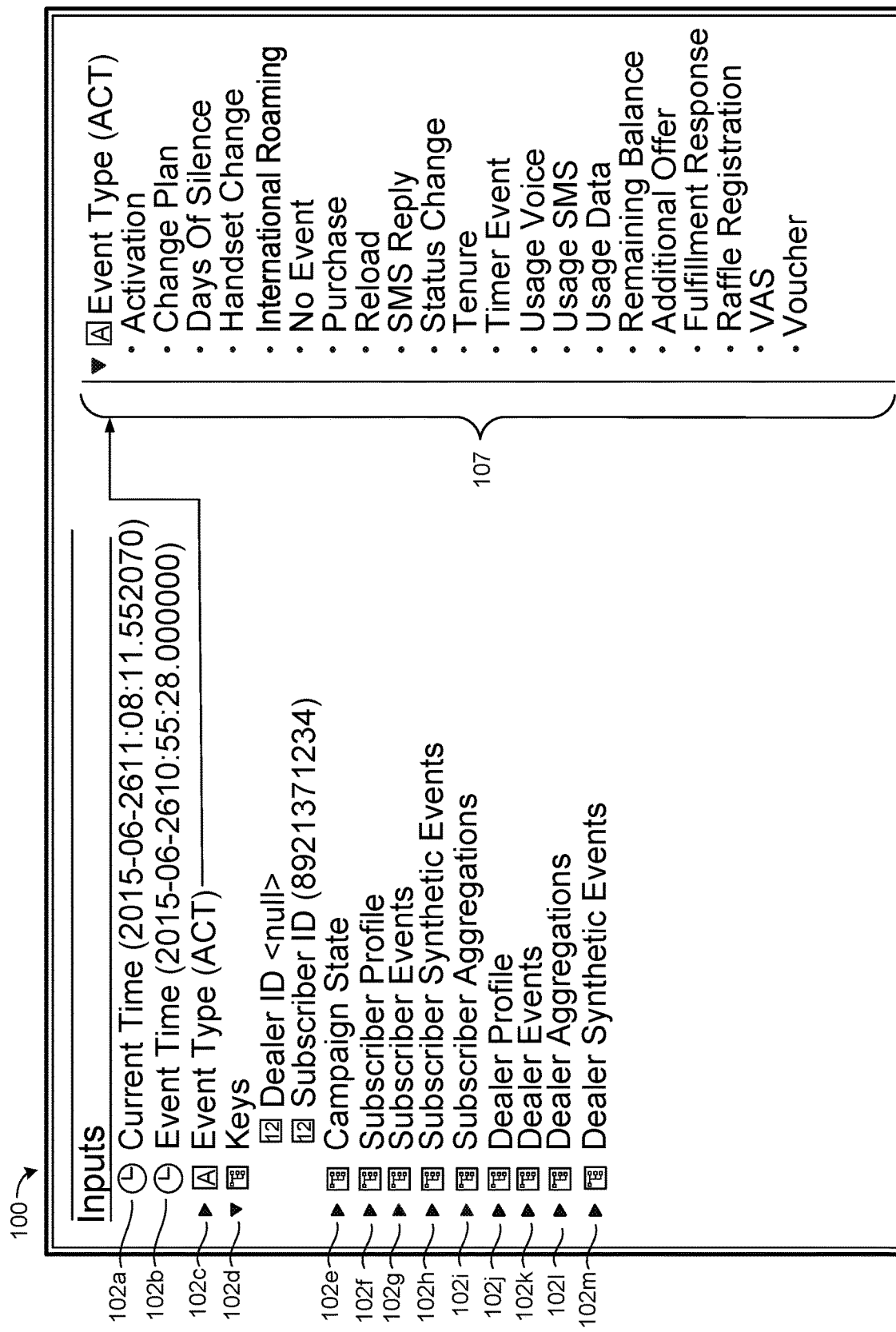
FIGS. 5-14 are example graphical user interfaces from an event palette.

Referring to FIG. 5, graphical user interface 100 is included in the event palette. In this example, the event palette is an application that includes a series of graphical user interfaces that display available, predefined events that may be used in defining one or more rules. In this example, a rule includes an expression defining a condition precedent, satisfaction of which causes execution of an action. Via the event palette, the user may define an expression that is based on an event. For example, the expression may by that a particular event reaches a threshold value or a predefined value. For that expression, the user may also define one or more actions to be executed, upon satisfaction of the expression.

In this example, graphical user interface 100 displays various inputs that may be used in defining an expression for a rule, as well as data indicative of attributes of detected events. Current time attributes 102*a* display data indicative of a current or present time. Event time attribute 102*b* displays data indicative of a time at which an event is most recently detected. Upon selection of event time attribute 102*b*, a user may view the event that was most recently detected. Event type data 102*c* displays data indicative of the various types of events that are available for use in defining a rule. These events are detected at various levels, including, e.g., a subscriber level and a dealer level. Upon selection of event type data 102*c*, listing 107 of the various different types of events is displayed. In this example, there is an activation event that specifies when a device is activated, a change of plan event that specifies when an entity changes a mobile device plan, a days of silence event that specifies a number of days in which a user has not used a mobile device, a handset change event that specifies when a user has changed a mobile device, and so forth.

Graphical user interface 100 also includes keys data 102*d* that displays a key for an entity, such as a dealer ID or a subscriber ID. That is, keys data 102*d* displays data indicative of a key or user ID for a particular entity for whom an event is being viewed in graphical user interface 100, when graphical user interface 100 is used to view actual events. In this example, a user may scroll (or select) through various different keys to view various different events associated with those respective keys. Upon selection of particular key, each of data or data fields 102*a*-102*m* is updated to display values for that particular key.

In this example, graphical user interface 100 allows a user to view detected events, e.g., via controls not shown. As the user views a particular detected event, keys data 102*d* (e.g., an updated identifier) is updated to display the ID for the event being viewed. When the user selects another, different event, keys data 102 is updated to display the ID for that other, different event. Graphical user interface 100 includes application state data 102*e*, including, e.g., data specifying a start and end time for an application, a number of actions that have been executed for a particular application and so forth.

Graphical user interface 100 also includes subscriber profile data 102*f* selection of which displays the various kinds of subscriber profile data that is inserted into the wide record and is available for use in defining rules. Graphical user interface 100 also includes subscriber events 102*g*, selection of which displays the various kinds of subscriber events that are inserted into the wide record and are available for use in defining rules. Graphical user interface 100 also includes subscriber synthetic events 102h, selection of which displays the various kinds of subscriber synthetic events that are inserted into the wide record and are available for use in defining rules. Generally, a synthetic event is a derived event. Graphical user interface 100 also includes subscriber aggregations 102i, selection of which displays near real-time aggregations for various subscriber events.

Graphical user interface 100 also includes profile data 102j, selection of which displays the various kinds of profile data that is inserted into the wide record and is available for use in defining rules. Graphical user interface 100 also includes events 102k, selection of which displays the various kinds of events that are inserted into the wide record and are available for use in defining rules. Graphical user interface 100 also includes synthetic events 102m, selection of which displays the various kinds of synthetic events that are inserted into the wide record and are available for use in defining rules. Graphical user interface 100 also includes aggregations 102l, selection of which displays near real-time aggregations for various events. In this example, a wide record includes events 102g. For a particular subscriber event, the wide record also includes a profile for that subscriber, as well as synthetic events and aggregations. The wide record includes events 102k. For a particular event associated with an entity, the wide record also includes a profile for that entity, as well as synthetic events and aggregations for that entity.

Figure 6:
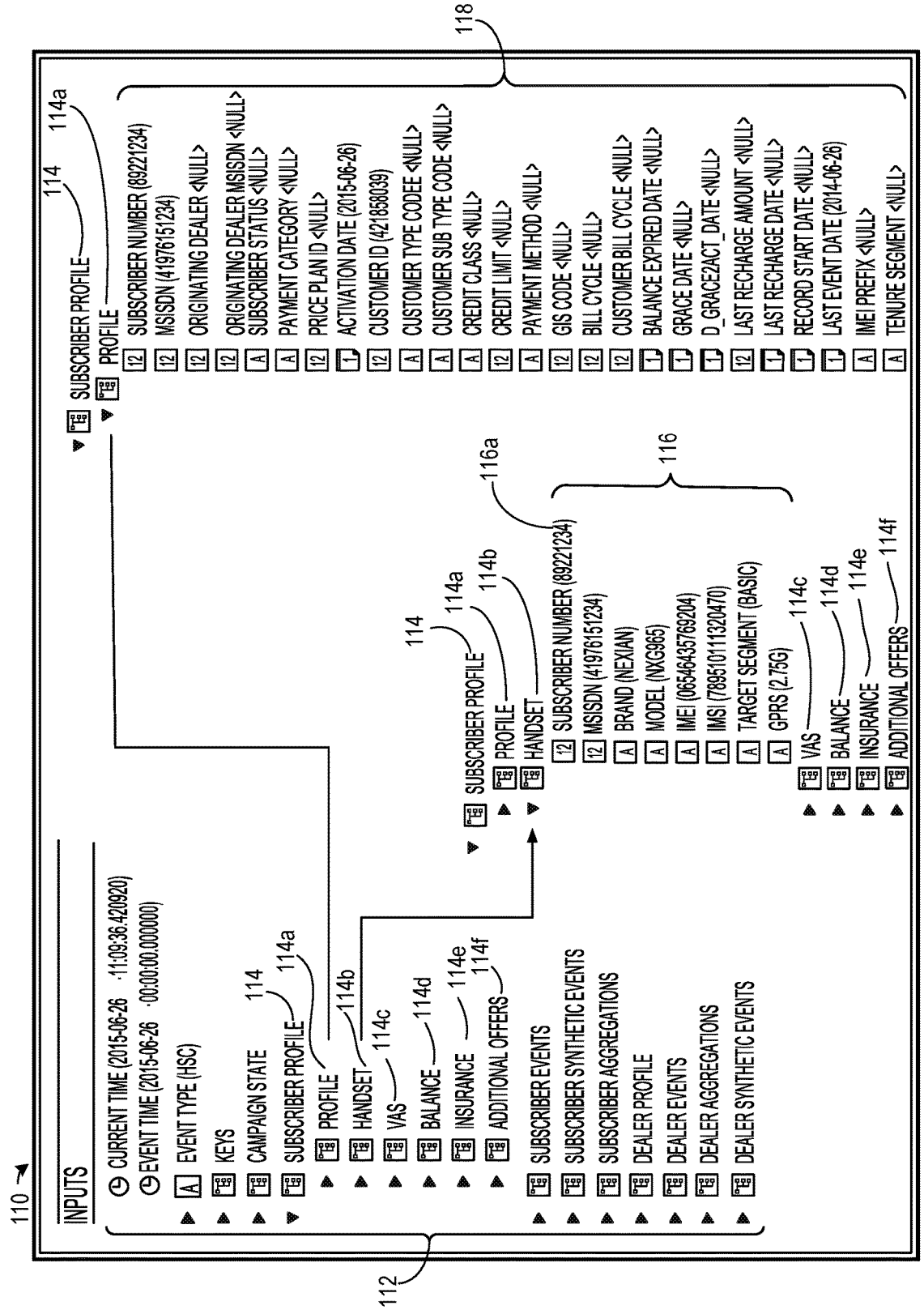

Referring to FIG. 6, graphical user interface 110 displays events 112 included in the event palette. In this example, subscriber profile data 114 includes profile data 114a, handset data 114b, Value Added Service (VAS) data 114c (e.g., ring tomes), balance data 114d, insurance data 114e and additional offers data 114f. Each of these types of data includes various types of sub-data, e.g., more granular or detailed data that is categorized under one of categories represented by data 114a-114f.

In this example, handset data 114b includes granular data 116, i.e., subscriber number, Mobile Station International Subscriber Directory Number (MSISDN), brand, model, International Mobile Station Equipment Identity (IMEI), International Mobile Subscriber Identity (IMSI), a target segment, and general packet radio service (GPRS). In this example, the various types of granular data 116 display actual values of a particular user record for the various types of user data. In this example, the subscriber number data displays value 116a, which is the value of the subscriber number for a particular subscriber for whom events and data are being viewed via graphical user interface 110. Graphical user interface 110 also displays granular data 118 for profile data 114a to provide granular, profile specific data, such as an originating entity and an activation date. This granular data 116, 118 is included in the wide record in association with subscriber events, as an enrichment to a subscriber event.

Figure 7:
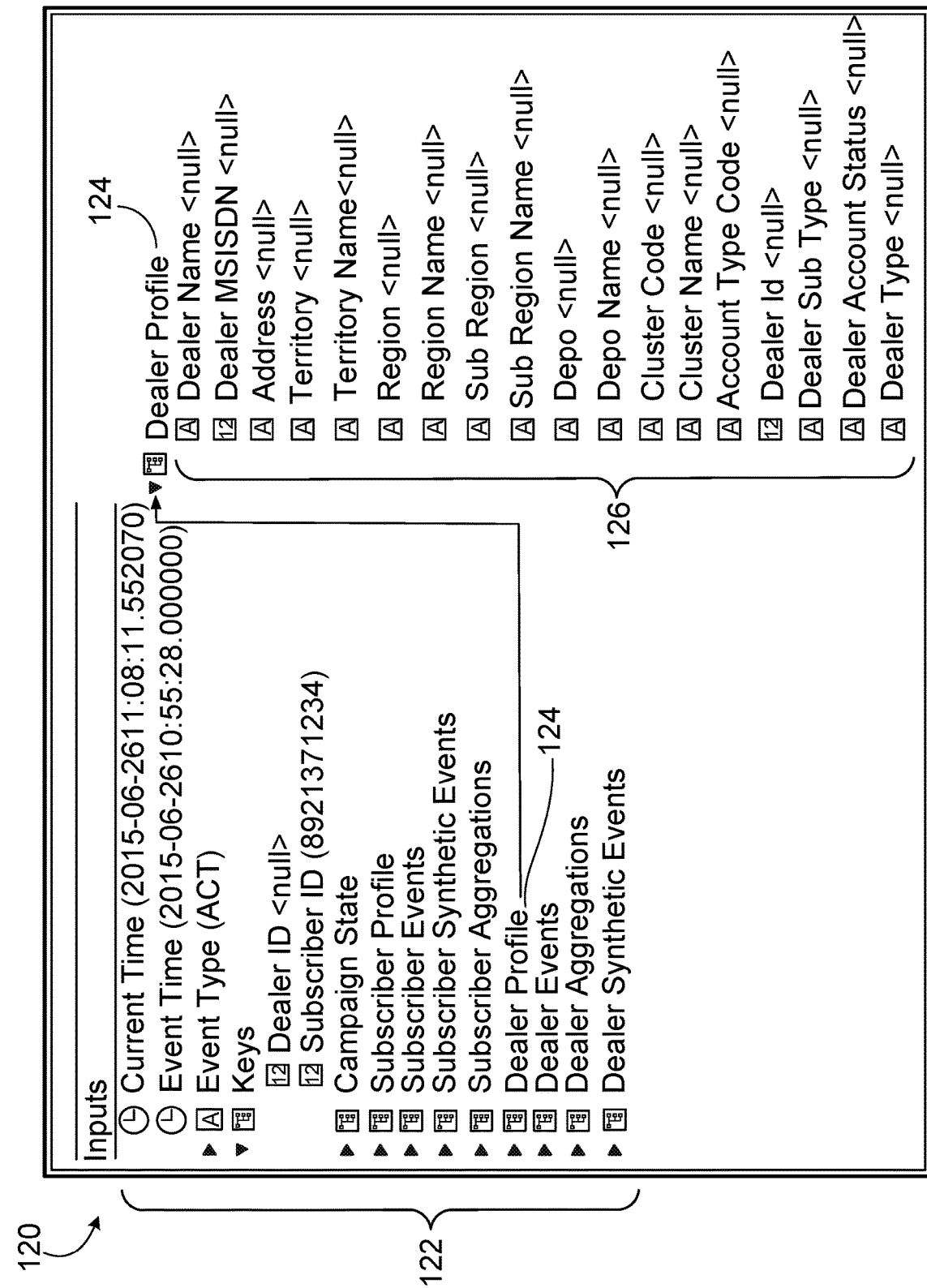

Referring to FIG. 7, graphical user interface 120 is included in the events palette and includes events 122. In this example, profile data 124 includes granular data 126, such as, name, MSISDN, address, and so forth. This granular data 126 is included in a wide record in association with an event.

Figure 8:
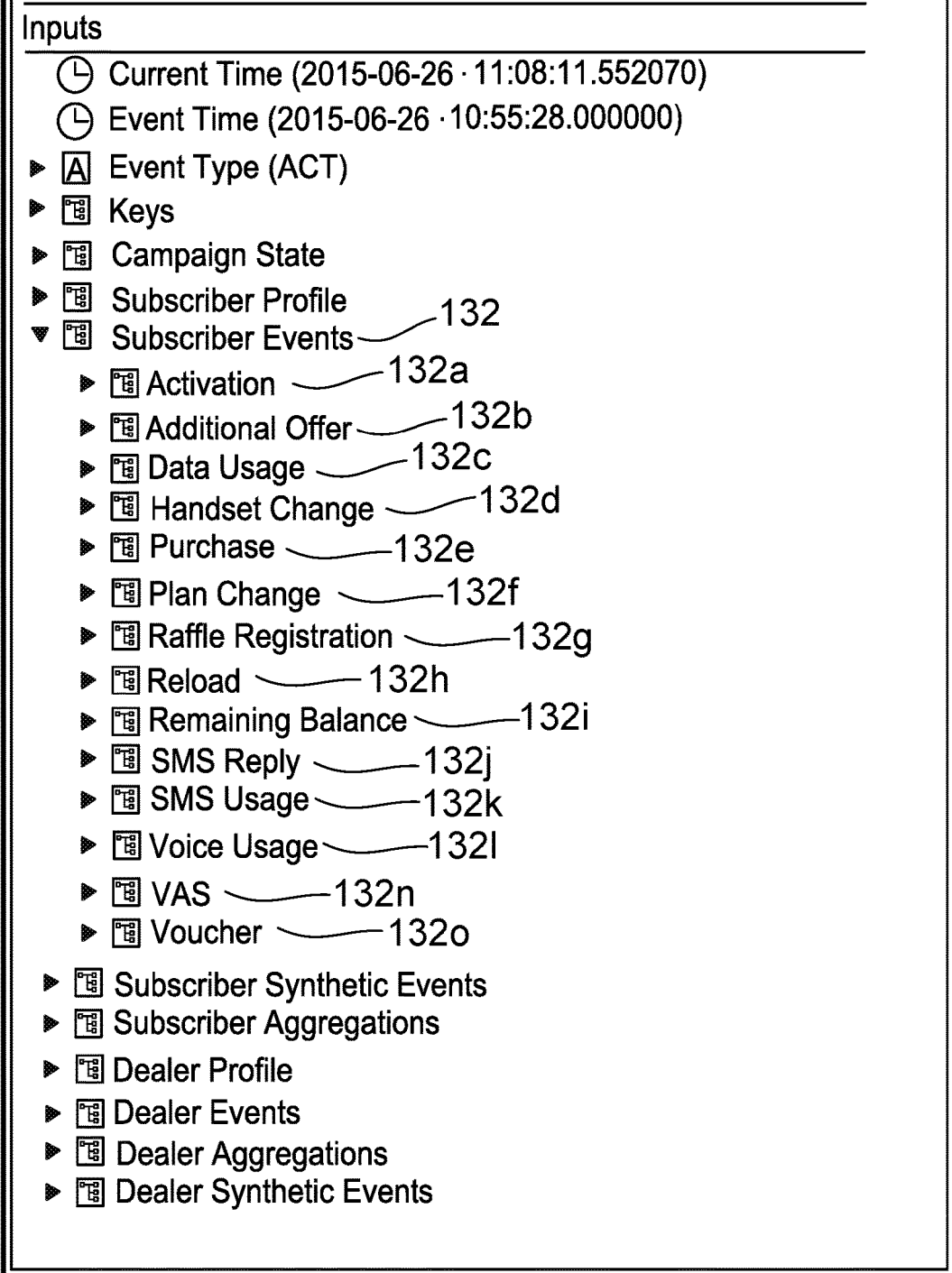

Referring to FIG. 8, graphical user interface 130 is included in event palette and displays the different types of subscriber events 132 that are available for use in defining rules and that are included in the wide record. Subscriber events 132 include activation event 132a (specifying if a user has activated a phone), additional offer event 132b (specifying whether a user has responded to an additional offer), data usage event 132c (specifying an amount of user data usage), handset change event 132d (specifying whether a user has upgraded or changed a handset), purchase event 132e (specifying whether a user has made a purchase), plan change event 132f (specifying whether a user has changed a device plan), raffle registration event 132g (specifying whether a user has entered into a raffle registration), reload event 132h (specifying whether a user has reloaded a mobile card or a mobile device), remaining balance event 132i (specifying a remaining amount on an account balance), SMS reply event 132j (specifying whether a user has replied to a SMS message), SMS usage event 132k (specifying an amount of SMS usage), voice usage event 132l (specifying an amount of voice usage), VAS event 132n, and voucher event 132o. Each of these subscriber events are included in the event record, in association with a subscriber profile and subscriber ID for subscribers for whom these events are detected and also in association with event aggregates for these events.

Figure 9:
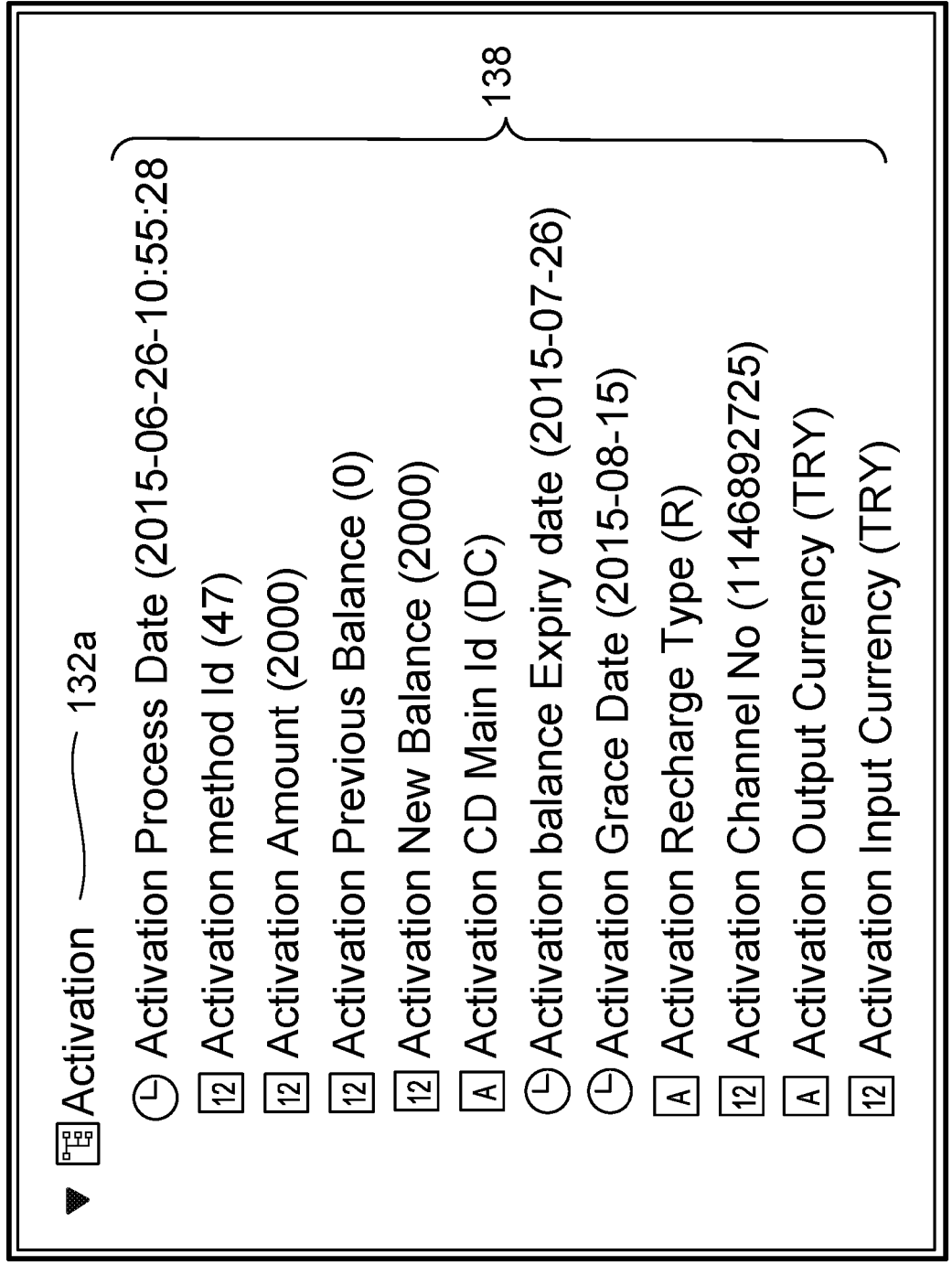

Referring to FIG. 9, graphical user interface 136 displays various types 138 of activation events 132a. For example, one type of activation event is an activation process date, which specifies a date on which a subscriber's activation is processed. In this example, a live value (i.e., Jun. 26, 2014 26 10:55:28) from a particular subscriber record is shown next to the activation process date event, because a user is viewing actual event values of records (e.g., in the wide record) as the user is defining rule. As previously described, a user may scroll through actual event values of various records.

Figure 10:
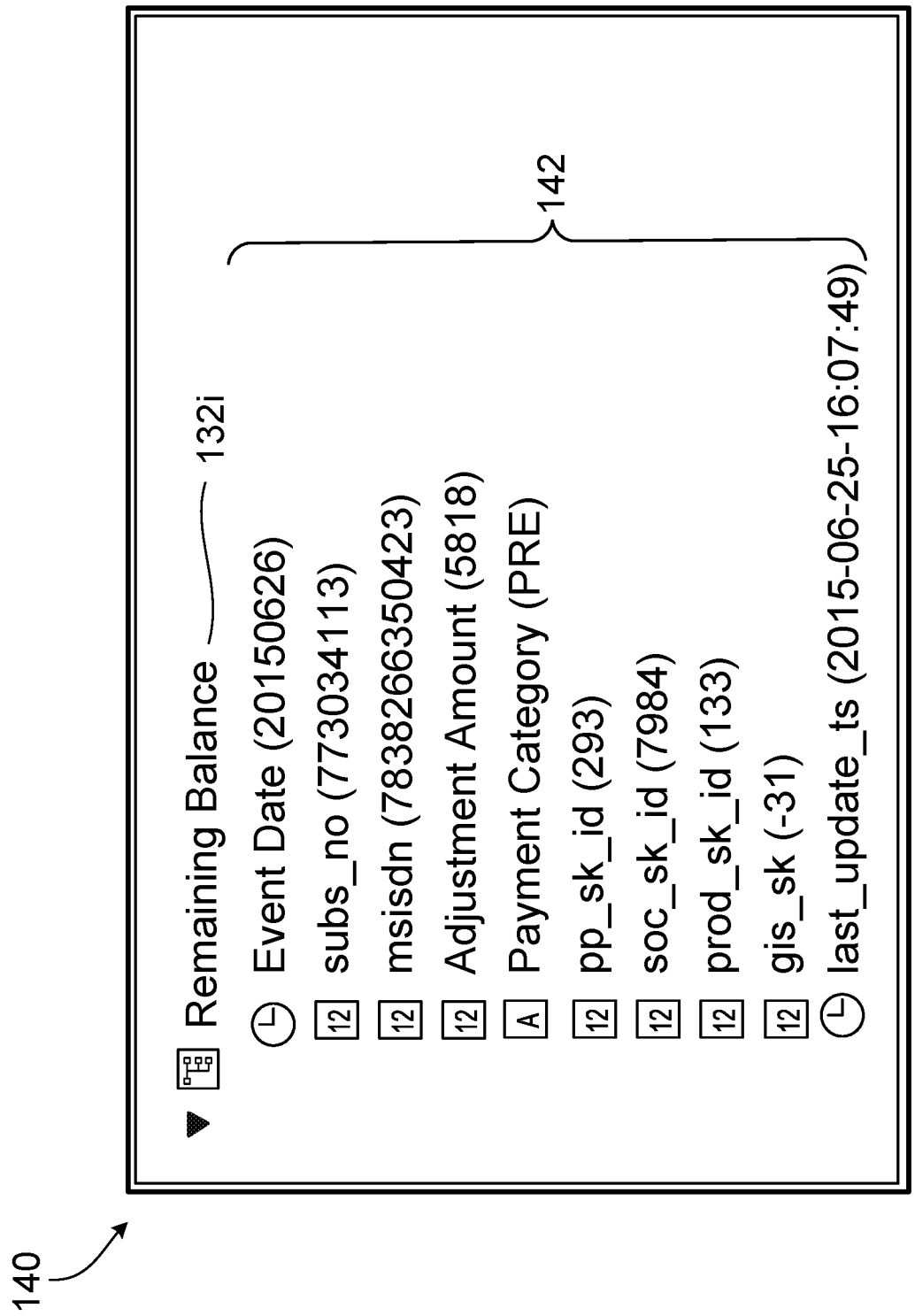
Figure 11:
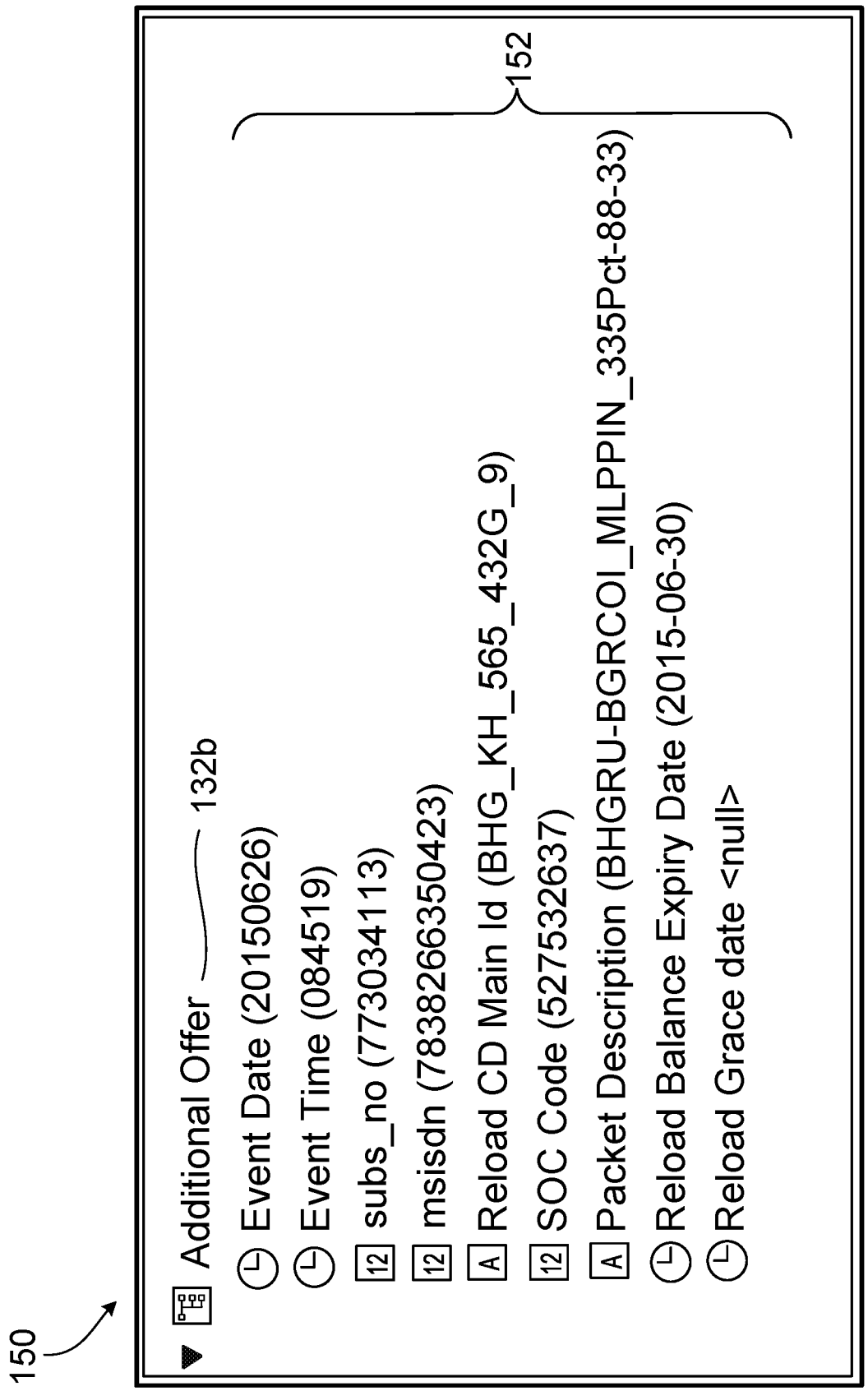
Figure 12:
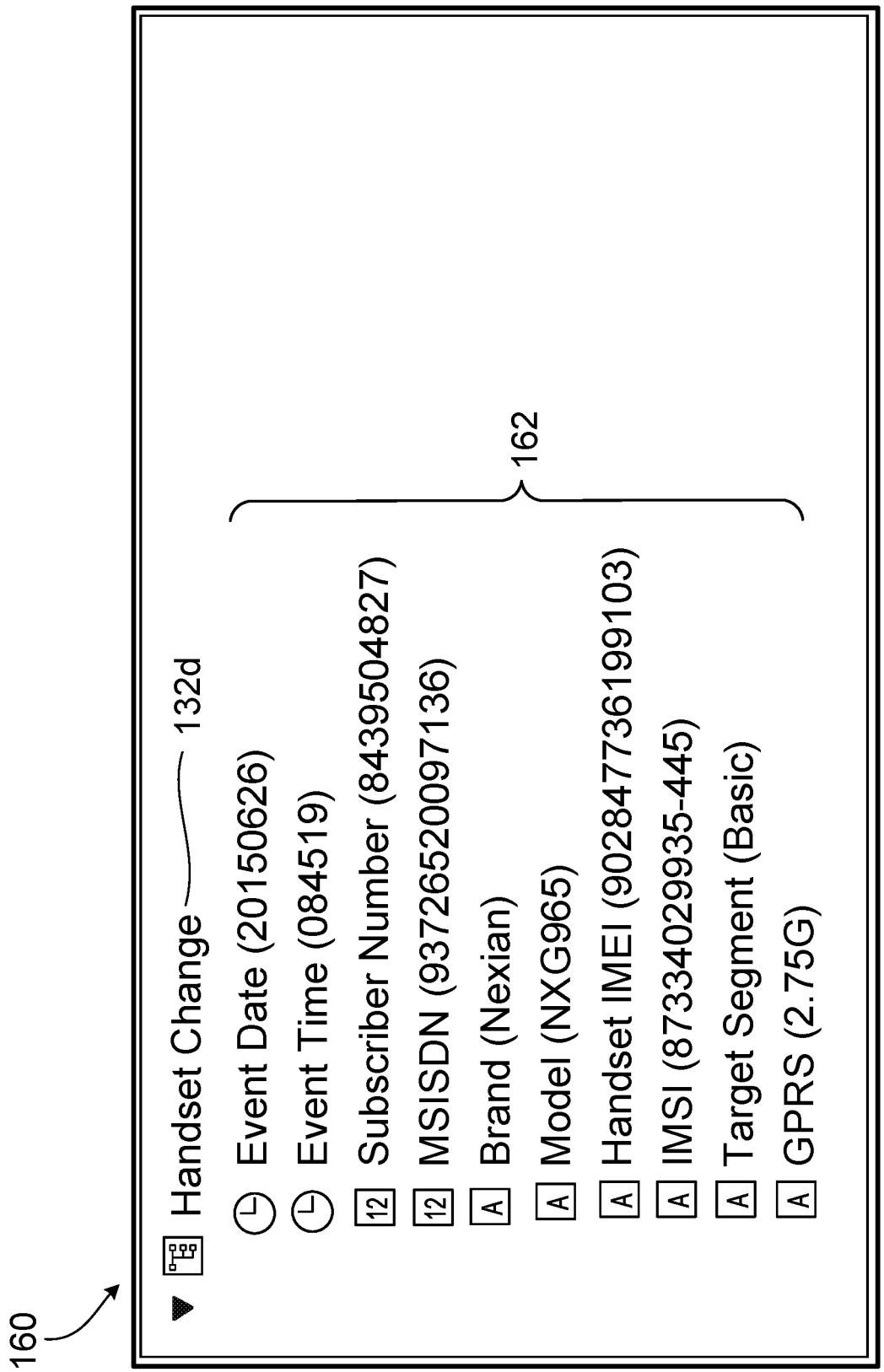

Referring to FIG. 10, graphical user interface 140 displays types 142 of remaining balance events 132i. In this example, these remaining balance events 132i are included in the wide record, e.g., when detected for various subscribers. Referring to FIG. 11, graphical user interface 150 displays various types 152 of additional offer events 132b for inclusion in the wide record. Referring to FIG. 12, graphical user interface 160 displays types 162 of handset change events 132d that are included in the wide record.

Figure 13:
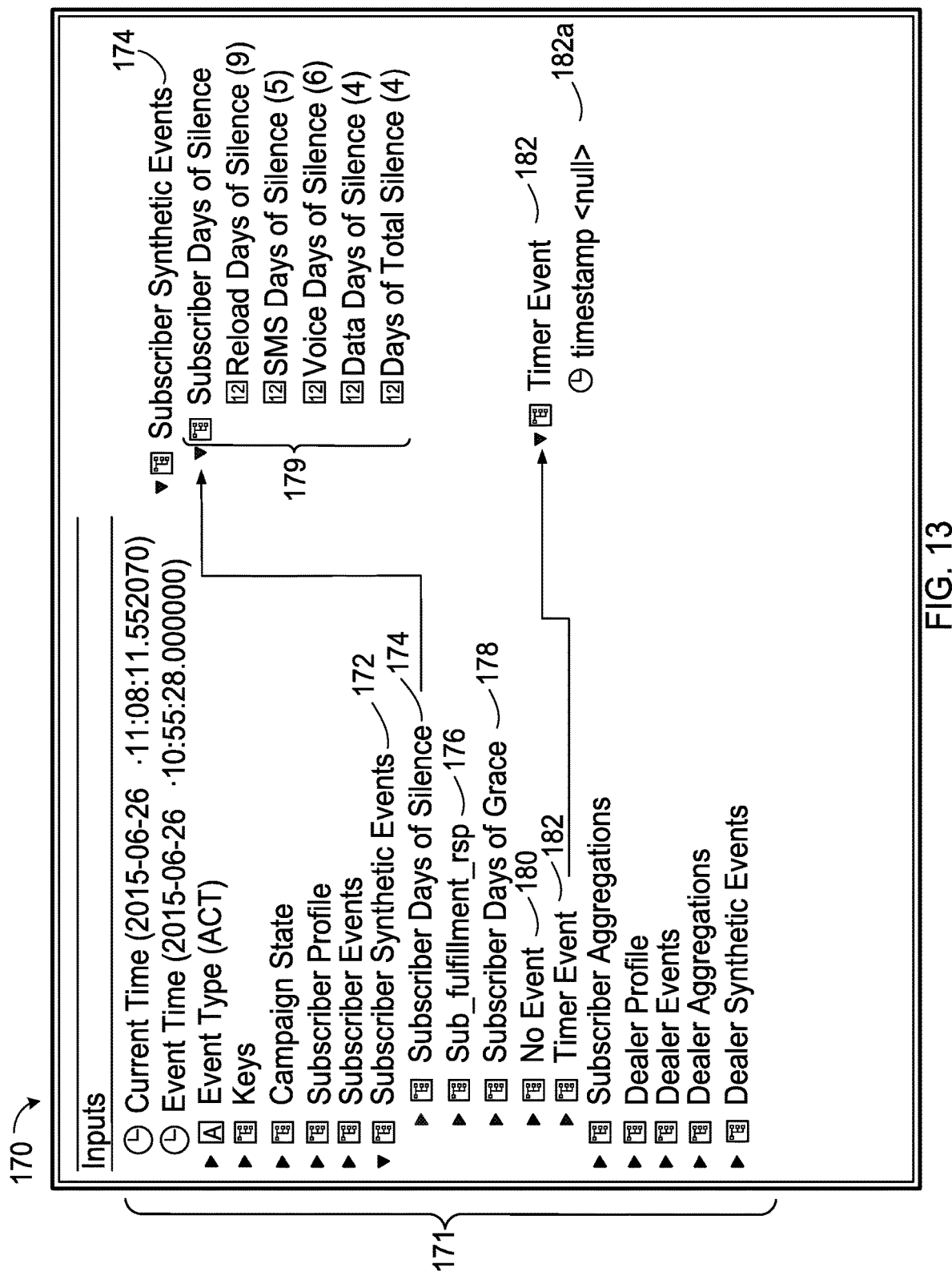

Referring to FIG. 13, graphical user interface 170 includes events 171. In this example, the various types of synthetic events 172 are shown, including, days of silence events 174 (which specify a number of days in which a user has not used a mobile device), fulfillment response events 176 (which specify whether a user has fulfilled or accepted an offer), days of grace events 178 (which specify a number of days to allow a user to be late with a payment or some other required action, before a reminder or some other action is taken), no events 180 (which specify an absence of any event within a specified period of time—for example, if a subscriber hasn't performed any events or actions in thirty days send a message), and timer events 182 (which specify that a particular time has arrived). In this example, graphical user interface 170 also displays the various types 179 of days of silence events, i.e., a period of time in which there is no activity or device usage. There are various types of days of silence events, such as, reload days of silence, SMS days of silence, voice days of silence, data days of silence and days of total silence. In this example, graphical user interface 170 also displays timestamp 182a for timer event 182. In this example, synthetic events 172 are included in an event record for a subscriber, e.g., by being included in the enrichments sub-record, in a sub-record dedicated to subscriber synthetic events (e.g., a subscriber synthetic events sub-record), or in the enrichments sub-record.

Figure 14:
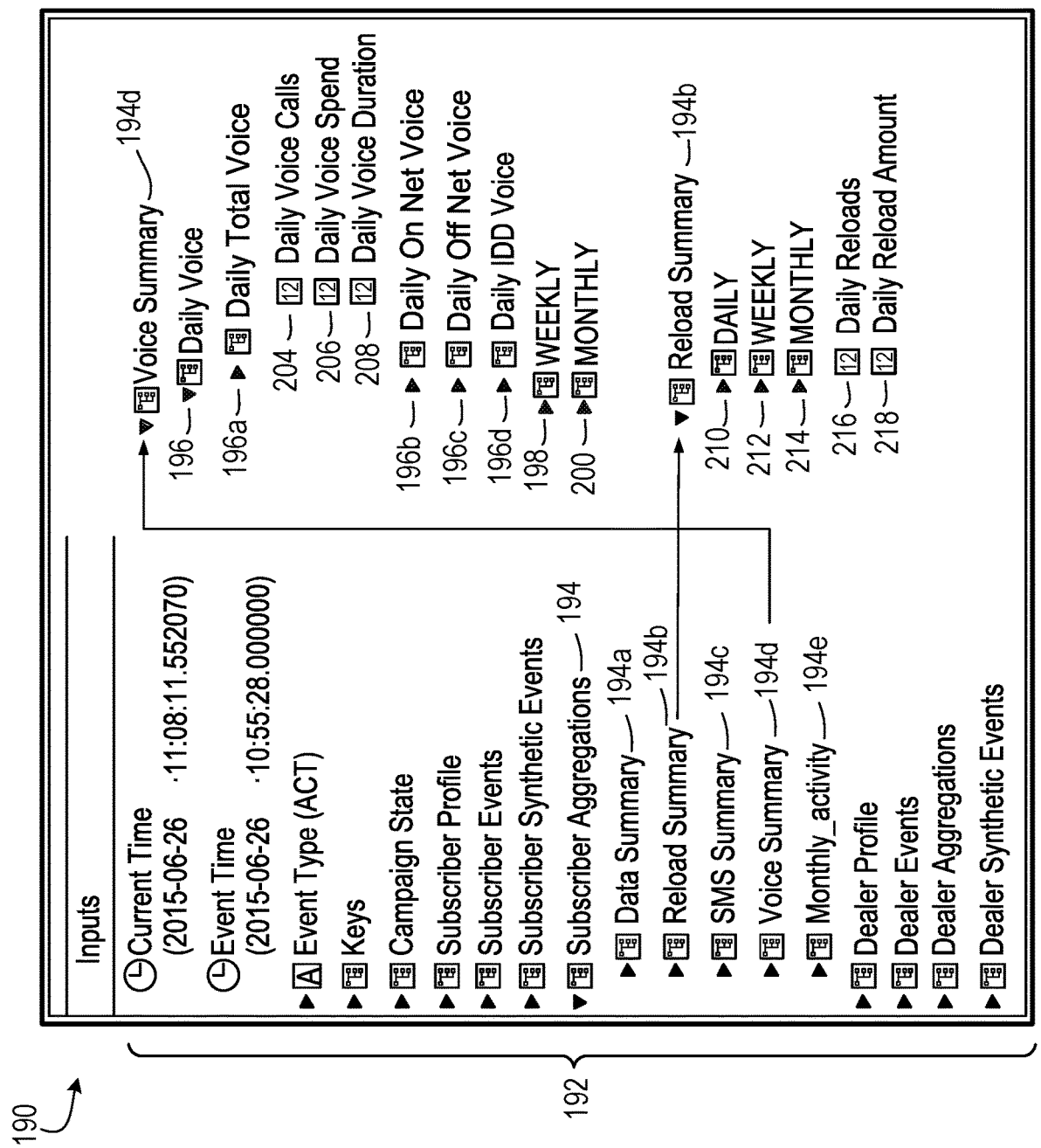

Referring to FIG. 14, graphical user interface 190 is included in the event palette and enables a user to select various event aggregations in defining a rule. In this example, graphical user interface 190 includes events 192, which include subscriber aggregations 194. As previously described, a subscriber aggregation is a near real-time aggregation for a particular subscriber event, with the near real-time aggregation being an aggregation of the batch data for the particular subscriber event and the incremental data for the particular subscriber event that is received in the real-time data stream. In this example, subscriber aggregations 194 include data summary aggregations 194a (e.g., an aggregation of data usage over various time periods), reload summary aggregations 194b (e.g., an aggregation of mobile device reloads over various time periods), SMS summary aggregations 194c (e.g., an aggregation of SMS usage over various time periods), voice summary aggregations 194d (e.g., an aggregation of voice usage over various time periods), and monthly activity aggregations 194e (e.g., aggregations occurring over monthly time periods).

Graphical user interface 190 displays the various types of events included in voice summary aggregations 194d. These types of events include daily voice event aggregations 196 (e.g., an aggregation of various types of voice usage on a daily basis for a particular subscriber), weekly voice event aggregations 198 (e.g., an aggregation of voice usage on a weekly basis for a particular subscriber), and monthly voice event aggregations 200 (e.g., an aggregation of voice usage on a monthly basis for a particular subscriber). Within daily voice event aggregations 196, there are various different aggregations, including, e.g., daily total voice aggregations 196a, daily on net (e.g., in network or on network) voice aggregations 196b, daily off net (e.g., roaming) voice aggregations 196c, and daily International Direct Dialed (IDD) voice aggregations 196d (e.g., overseas calls). For daily total voice aggregations 196a, CDA system 32 also determines different types of daily total voice aggregations, such as, daily voice calls 204 (e.g., data specifying an amount of voice calls for a particular subscriber on a daily basis), daily voice spend 206 (e.g., data specifying an amount of money spent by a particular subscriber on voice calls on a daily basis), and daily voice duration 208 (e.g., data specifying a duration of daily calls for a particular subscriber). These various types of voice summary aggregations 194d are added to the record being generated to include the various events in the event palette.

Graphical user interface 190 also displays various types of reload summary aggregations 194b, such as, daily reload summary aggregations 210 (e.g., an amount of reloads for a particular subscriber aggregated over a day), weekly reload summary aggregations 212 and monthly reload summary aggregations 214. In this example, there are various types of daily reload summary aggregations 210, including, daily reloads 216 (e.g., a number of times a particular subscriber has performed a reload in a particular day) and daily reload amount 218 (e.g., an amount of reloads performed by a particular subscriber in a day). In this example, these various types of reload summary aggregations 194b are added to the wide record being generated by CDA system 32.

Figure 15:
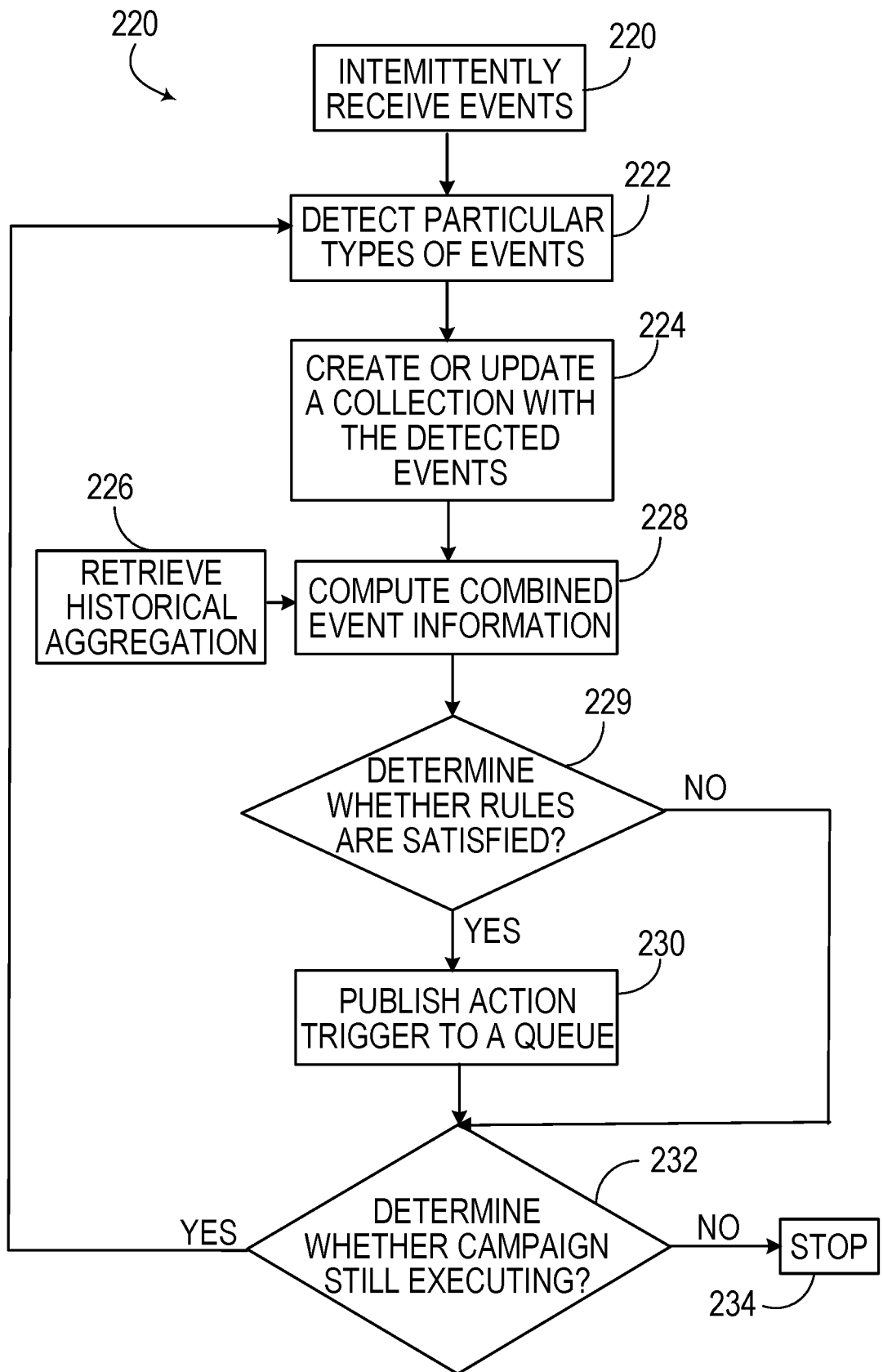
FIGS. 15 and 17 are each a flowchart.

Referring to FIG. 15, CDA system 32 executes process 220 in executing event-based marketing, in which multiple, different applications (e.g., such as applications or programs) are executed against real-time data streams, as the data is being received. In operation, CDA system 32 intermittently receives (220) data from one or more data streams, such data including events. As events from the one or more data streams continue to be intermittently received, CDA system 32 detects (222) two or more particular events in the received events, where the detected two or more particular events share a common quality, such as, being defined in the event palette. In another example, the common quality could be a common user ID or user key, as CDA system 32 detects events for a particular entity. CDA system 32 creates (or updates) (224) a collection of events that include the detected two or more particular events. In an example where the collection has already been created (e.g., during a prior iteration of process 220), CDA system 32 updates the collection, e.g., with newly detected events. For example, CDA system 32 creates a record (e.g., a wide record) of the detected events. In this record, each event is associated with an entity ID, e.g., such as a subscriber ID or an entity ID. In this example, the entity ID is already associated with the event in the real-time data stream and CDA system 32 inserts the entity ID and the event into the wide record.

CDA system 32 enriches the events in the wide record, by adding (or attaching) to the record profile data for the entities associated with the respective events and be adding event aggregations. In an example, for at least one particular event included in the collection of events, CDA system 32 retrieves (226), from a data repository, a historical aggregation related to the at least one particular event, with the historical aggregation being a pre-computed aggregation of event data from a prior time period. In this example, the historical aggregation is a precomputed aggregation from a starting time to an ending time. This precomputed aggregation is computed in batch (from individual events occurring during the starting time to the ending time) and is referred to as batch data. CDA system 32 also computes (228) combined event data, based on the at least one particular event and on the historical aggregation. In this example, the combined event data is the near real-time aggregation for the particular event for a particular subscriber.

The near real-time aggregation is based on the historical aggregation (for this particular type of event for this particular subscriber) and the incremental events (for this particular event type for this particular subscriber) that are received in the real-time data stream, since the last batch computation of the event aggregate. At a time the combined event data is computed, the incremental event may be received at that time in the near real-time data streams or may be stored in memory of CDA system 32, when the combined event data is computed after the incremental event is received in the near real-time data streams but before the incremental event is stored in an EDW. This near real-time aggregation is inserted into the wide record for the appropriate event, along with the other above-described enrichments. The rules (defining multiple applications and/or applications) are executed against this wide record (including the events and the enrichments), e.g., by passing the sub-records included in the wide record through a rules engine that implements the rules. CDA system 32 determines (229) whether one or more of the executed rules are satisfied by contents of the wide record (e.g., by contents of one of the sub-records in the wide record). Upon detection of a sub-record (that include a particular event for a particular entity and related enrichments and aggregation) that satisfies the condition precedent of a rule, CDA system 32 identifies an action for this rule and generates an action trigger that includes data specifying which action to execute and for which entity. Based on the combined event data, CDA system 32 publishes (230) the action trigger to a queue for initiation of one or more actions. In this example, the action trigger is an entry in the queue. CDA system 32 analyzes the entries in the queue (e.g., in a first in, first out order) and performs or initiates performance of the actions specified by the action triggers, e.g., such as sending a SMS message alerting an entity of an offer.

Following publishing of the action trigger or when CDA system 32 determines that none of the executed rules are satisfied by contents of the wide record (e.g., by contents of one of the sub-records in the wide record), CDA system 32 determines (232) whether one or more of the applications are still executing. If one or more of the applications are still executing, CDA system 32 repeats actions 222, 224, 226, 228, 230, 232, e.g., until the application ceases execution. If the application has ceased execution, CDA system 32 stops (234) process 220.

Figure 16:
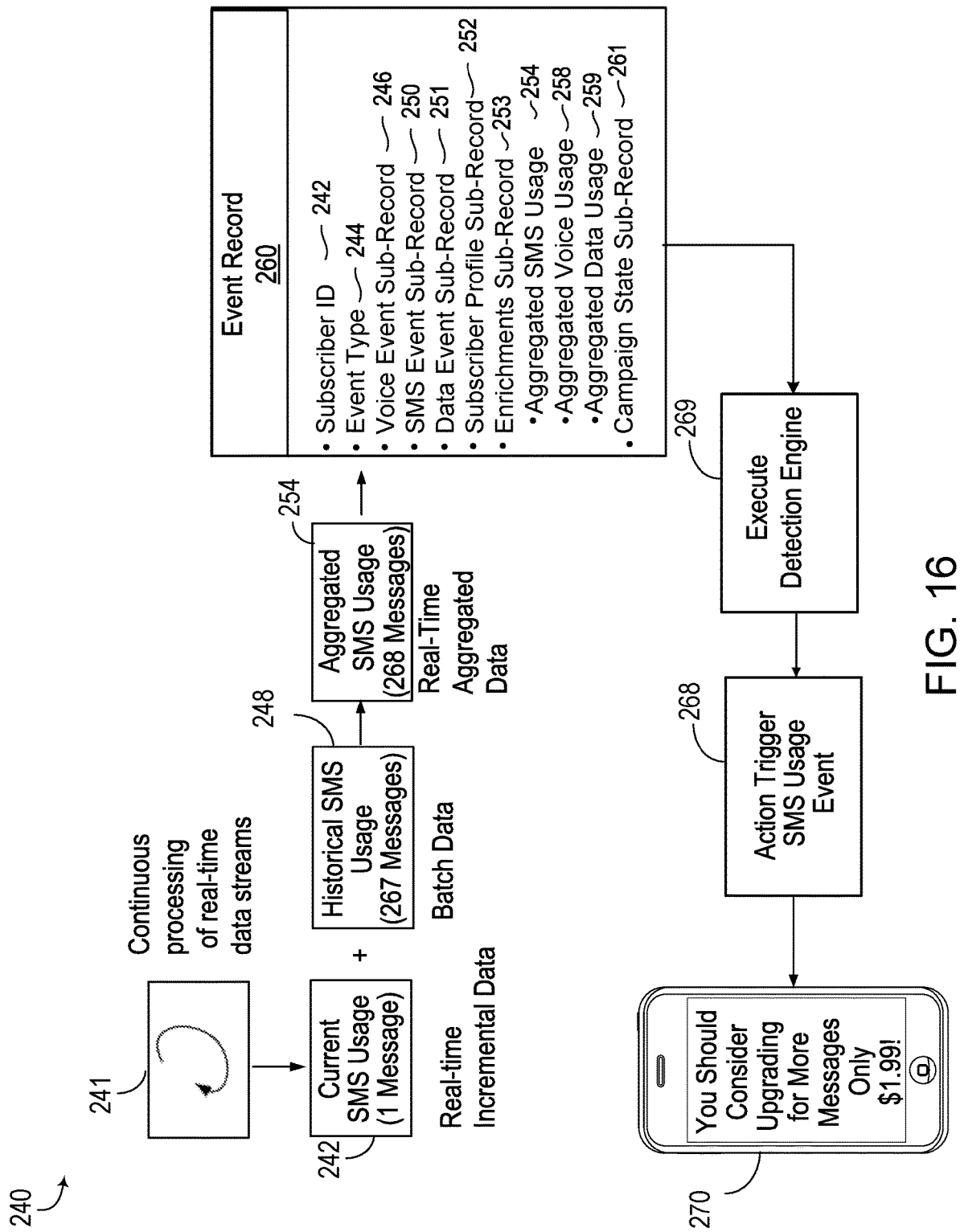
FIG. 16 is a diagram of computing near real-time event aggregates.

Referring to FIG. 16, environment 240 illustrates an example implementation of event-based marketing. In this example, CDA system 32 executes listening process 241 (e.g., on collection engine 42) to intermittently (e.g., continuously) listen for, receive and process one or more real-time data streams. Listening process 241 receives and processes incremental data 242 for a particular event type for a particular subscriber (e.g., current SMS usage of 1 message). To compute the near real-time aggregates, CDA system 32 retrieves (e.g., from a data repository) batch data 248 for the type of event represented in incremental data 242 (e.g., a SMS event). In this example, batch data 248 includes a historical aggregation of SMS usage for the entity associated with incremental data 242. In this example, CDA system 32 computes aggregated SMS usage 254 (for the particular entity associated with data 242, 248) by aggregating incremental data 242 with batch data 248. In a variation, CDA system 32 may also access additional incremental data for SMS usage from memory of CDA system 32, for example, when new incremental data has been previously received but CDA system 32 has not yet executed its batch process of storing this newly received data into an EDW. In this variation, CDA system 32 generates near real-time aggregated SMS usage data 254 by aggregating incremental data 242, batch data 248 and the additional incremental data stored in memory.

CDA system 32 also computes aggregated voice usage 258 (for the particular entity associated with data 242) by aggregating incremental voice usage data (as stored in memory of CDA system 32) with batch voice usage data (retrieved from an EDW). CDA system 32 also computes aggregated data usage data 259 (for the particular entity associated with data 242) by aggregating incremental data usage (as stored in memory of CDA system 32) with batch data usage (retrieved from an EDW). CDA system computes aggregated voice usage 258 and aggregated data usage data 259 for inclusion in event record 260, to enable event record 260 to be used by an application in which certain actions are dependent on threshold values for aggregated data and/or voice usage.

CDA system 32 produces event record 260 by inserting into event record 260 subscriber ID field 242, event type field 244, voice event sub-record 246, SMS event sub-record 250 (which includes current SMS usage event 242), data event sub-record 251, subscriber profile sub-record 252, enrichments sub-record 253, and application state sub-record 261, each of which type of sub-record was previously described with regard to FIG. 3. In this example, enrichments sub-record 253 includes aggregated SMS usage data 254, aggregated voice usage data 258, and aggregated data usage data 259. In this example, current SMS usage event 242 is stored in SMS event sub-record 250.

In this example, CDA system 32 executes 269 a detection engine to run one or more applications against event record 260 to determine which condition precedents of the rules in the one or more applications are satisfied by event record 260. Is this example, CDA system 32 detects that current SMS usage event 242 in SMS event sub-record 250 satisfies one of the condition precedents of a rule in an application to upgrade customers. Based on this detection, CDA system 32 generates action trigger 268 to execute the specified action. In this example, action trigger 268 specifies an action of emailing a customer and notifying the customer of a promotion for updating service. CDA system 32 executes the action trigger to cause email 270 to be sent to the user.

Figure 17:
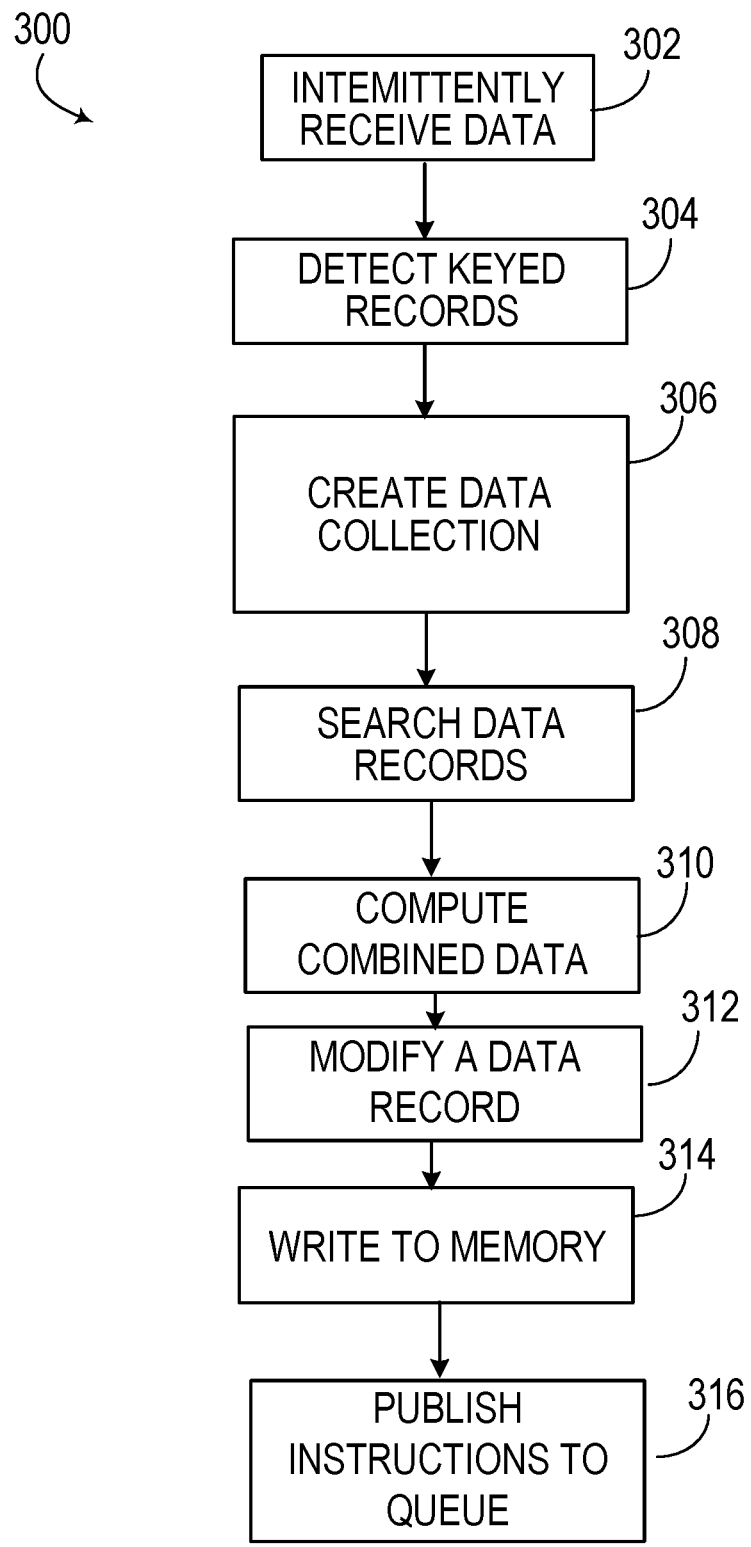

Referring to FIG. 17, process 300 is performed by a search and retrieval data processing system for processing data. In operation, the system intermittently receives (302) data from one or more data streams, the received data including data records. As data from the one or more data streams continue to be received, the system detects (304) two or more particular data records in the received data records, where the detected two or more particular data records each include a particular identifier. In this example, the system detects keyed records, e.g., data records associated with a particular identifier or key. For that particular identifier, the system creates (306) a collection of data records that include the detected two or more particular data records. For at least one particular data record included in the collection of data records, the system searches (308) data records in a data repository (and/or data cached or stored in memory) for a historical aggregation of data associated with the particular identifier, with the historical aggregation being a pre-computed data aggregation from a prior time period. The system computes (310) combined data, based on the at least one particular data record and on the historical aggregation. In this example, the combined data includes an enhancement, as the data received from the real-time data streams does not include this combined data.

The system also modifies (312) a data record by inserting the combined data into a field of the data record and by inserting data from at least one of the data records in the collection into another field of the data record. For example, the modified data record may include a record of all events, e.g., event record 60 (FIG. 3). In this example, the combined data may be voice aggregation data and may be inserted into enrichments sub-record 62g. In this example, the enrichments sub-record is a field in event record 60. In another example, the modified data record may include a data record with fields to be populated with other records or other data received or computed. The system also inserts data from at least one of the data records in the collection into another field of the data record. For example, when one of the data records included in the collection is a voice record indicative of a location, duration and time of receipt of a voice call, the system inserts this data from the voice record into field 62c of record 60. In this example, the system may also add other enrichments or enhances to the record, e.g., as profile data—that is inserted into field 62f of record 60.

The system also processing the modified data record by applying one or more rules to the modified data record. Based on applying the rules, the system writes (314) to memory of the system one or more instructions for initiation of one or more actions. In some example, an instruction includes an action trigger. The system publishes (316) the one or more instructions to a queue for initiation of the one or more actions.

Using the techniques described herein, an event palette defines different types of events (e.g., SMS, voice, data and so forth) operating at different levels (e.g., a dealer level, a subscriber level and so forth). Using these pre-defined events, a user (e.g., an analyst) can define rules that specify various actions to be executed upon satisfaction of one or more of the events defined in the event palette. To enable a single system to execute multiple applications that include rules for these various types of events and operating levels, the system generates a wide record of the events included in the event palette and enriches these events with profile data and aggregations to provide for a near real-time application that can implement near real-time aggregations. Rather than implementing a batch application, the real-time application executed using the techniques described herein can be a multi-event application that produces aggregate histories in real-time for large volumes of data and low latency. Through the near real-time processing of data via continuous flows, generation of the wide record and the building of the aggregates both in batch and incrementally, the system described herein is able to more efficiently and quickly aggregate data and execute an application with a decreased amount of latency in executing multi-event applications with near real-time aggregations. In an example, the system generates and computes a record (e.g., a wide record) of events, enrichments (e.g., profile information) and aggregations for a particular key, e.g., prior to publishing the record to an application. By doing so, the system is more computationally efficient at run time when the applications are being executed and applied to the generated records, e.g., because the system has already precomputed aggregates and queried for profile information and had included this pre-computed information into the record for processing, and therefore does not need to introduce latency into processing by doing so as the applications are being executed. In particular, the pre-computation of the aggregates, the pre-generation and compilation of sub-records, and the generation of a single record that includes all the fields (including fields for aggregations) and sub-records for data and events that the system is configured to parse for event detection and the pre-population of at least some of those fields with the pre-computed aggregates or with real time aggregates (based on aggregating the incremental data with the pre-computed aggregates) enables the system to produce a single, comprehensive record for data processing, rather than the system having to access and retrieve data and compute aggregates as the processing of the records is being performed and as records are being received. This generation of the single record with all the fields and sub-records enables more efficient data access and processing by the system, relative to efficiency of accessing data from a data warehouse at run time and computing aggregates at run-time. Using the techniques described herein, the system publishes this generated record (i.e., the single record) to a queue for processing by the system and in doing so decreases run-time latency in the processing of records.

The techniques described above can be implemented using software for execution on a computer. For instance, the software forms procedures in one or more computer programs that execute on one or more programmed or programmable computer systems (which can be of various architectures such as distributed, client/server, or grid) each including at least one processor, at least one data storage system (including volatile and non-volatile memory and/or storage elements), at least one input device or port, and at least one output device or port. The software can form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software can be provided on a storage medium and/or a hardware storage device, such as a CD-ROM, readable by a general or special purpose programmable computer, or delivered (encoded in a propagated signal) over a communication medium of a network to a storage medium of the computer where it is executed. All of the functions can be performed on a special purpose computer, or using special-purpose hardware, such as coprocessors. The software can be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system can also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications can be made without departing from the spirit and scope of the invention. For example, some of the steps described above can be order independent, and thus can be performed in an order different from that described. Additionally, the foregoing examples and techniques are broadly applicable for various different applications.

It is to be understood that the foregoing description is intended to illustrate and not to limit the scope of the invention, which is defined by the scope of the appended claims. For example, a number of the function steps described above can be performed in a different order without substantially affecting overall processing. Other embodiments are within the scope of the following claims.

What is claimed is:

1. A method performed by a data processing system for processing data, the method including:
   intermittently receiving data from one or more data streams, the received data including data records, a data record including data indicative of one or more events;
   as data from the one or more data streams continue to be received, detecting, in the received data records each keyed based on an entity identifier, two or more data records that are each keyed based on a particular entity identifier;
   for at least one detected data record including data indicative of a given event, wherein the at least one detected data record is associated with a particular time,
   searching for a pre-computed aggregation of first data indicative of the given event and keyed based on the same particular entity identifier as the two or more data records detected in the one or more data streams,
   wherein at least some of the first data of the pre-computed aggregation, which is indicative of the given event and keyed based on the same particular entity identifier as the two or more data records detected in the one or more data streams, is associated with a given time from a prior time period,
   with the prior time period being defined as a range of given times associated with the at least some of the first data of the pre-computed aggregation that are keyed based on the same particular entity identifier as the two or more data records detected in the one or more data streams, and wherein the end of the prior time period is prior to or the same as the particular time associated with the at least one data record that is detected in the one or more data streams and that is keyed based on the same particular entity identifier;

accessing near real-time data, which is indicative of the same given event as the pre-computed aggregation and keyed based on the same particular entity identifier as the pre-computed aggregation, from a field in the at least one detected data record and received from the one or more data streams and associated with the particular time that is after or the same as the end of the prior time period that includes the given times associated with the least some of the first data of the pre-computed aggregation keyed based on the same particular entity identifier;

generating a near real-time aggregation for the same given event as the pre-computed aggregation and for the same particular entity identifier as the pre-computed aggregation by combining (i) the near real-time data, which is indicative of the given event and keyed based on the same particular entity identifier, included in the accessed field of the at least one detected data record that is received from the one or more data streams, (ii) with the pre-computed aggregation of data that is indicative of the given event and that is keyed based on the same particular entity identifier, to produce the near real-time aggregation for the given event and for the same particular entity identifier, with the aggregation being near real-time with regard to when the data in the one or more data streams is received;

populating a data record that is keyed based on the same particular entity identifier with the near real-time aggregation for the given event and for the same particular entity identifier, and with data received from the one or more data streams, by:

inserting, into a field of the data record keyed based on the same particular entity identifier, the near real-time aggregation for the given event and for the same particular entity identifier and generated from combining (i) the near real-time data included in the at least one data record detected from the one or more data streams and that is indicative of the given event and that is keyed based on the same particular event identifier, and (ii) the pre-computed aggregation of data that is indicative of the given event and that is keyed based on the same particular event identifier, inserting data from at least one of the data records received from the one or more data streams and keyed based on the same particular entity identifier into another field of the data record being populated and keyed based on the same particular entity identifier; and processing the populated data record by applying one or more rules to the populated data record;

based on applying the rules, writing to memory one or more instructions for initiation of one or more actions; and publishing the one or more instructions to a queue for initiation of the one or more actions.

2. The method of claim 1, wherein inserting the data from the at least one of the data records into the other field of the data record includes:

inserting data from the at least one detected data record into the other field of the data record modified by inserting.

3. The method of claim 1, further including:
collecting a plurality of data records;
publishing the data records to a single queue;
from the queue, detecting the two or more data records;
joining together the detected two or more data records into a first data record, with the detected two or more data records including data representing different types of events; and
augmenting the first data record with the combined data for the at least one detected data record.

4. The method of claim 1, wherein the prior time period is a time prior to performance of the detecting.

5. The method of claim 3, further including:
attaching, to the first data record, customer profile data for a customer associated with a particular event included in the first data record; and
attaching to the first data record an appendable lookup file (ALF) with a historical aggregation for the particular event.

6. The method of claim 1, further including:
adding incremental data to a historical aggregation, with the incremental data including data from a time at which the historical aggregation was computed to a near present time that is within a minute of the present time; and
producing, based on the adding of the incremental data, a near real-time aggregation of the data.

7. The method of claim 1, further including:
receiving, from a client device of a user, data representing one or more rules defining an application;
generating, based on the received data, the one or more rules that define the application; and
implementing, based on executing the one or more rules, the application against the one or more data streams intermittently received.

8. The method of claim 1, wherein receiving the one or more data streams includes:
receiving a first data stream with data representing a first type of event; and
receiving a second data stream with data representing a second type of event.

9. The method of claim 1, further including executing one or more applications against a published action trigger included in the one or more instructions.

10. The method of claim 1, wherein a data record includes an event.

11. The method of claim 1, wherein searching includes searching in a data repository or searching in-memory.

12. A data processing system for processing data including:
one or more processors; and
one or more machine-readable hardware storage devices storing instructions that are executable to cause the one or more processors to perform operations including:
intermittently receiving data from one or more data streams, the received data including data records, a data record including data indicative of one or more events;
as data from the one or more data streams continue to be received, detecting, in the received data records each keyed based on an entity identifier, two or more data records that are each keyed based on a particular entity identifier;

for at least one detected data record including data indicative of a given event, wherein the at least one detected data record is associated with a particular time, searching for a pre-computed aggregation of first data indicative of the given event and keyed based on the same particular entity identifier as the two or more data records detected in the one or more data streams, wherein at least some of the first data of the pre-computed aggregation, which is indicative of the given event and keyed based on the same particular entity identifier as the two or more data records detected in the one or more data streams, is associated with a given time from a prior time period, with the prior time period being defined as a range of given times associated with the at least some of the first data of the pre-computed aggregation that are keyed based on the same particular entity identifier as the two or more data records detected in the one or more data streams, and wherein the end of the prior time period is prior to or the same as the particular time associated with the at least one data record that is detected in the one or more data streams and that is keyed based on the same particular entity identifier;

accessing near real-time data, which is indicative of the same given event as the pre-computed aggregation and keyed based on the same particular entity identifier as the pre-computed aggregation, from a field in the at least one detected data record and received from the one or more data streams and associated with the particular time that is after or the same as the end of the prior time period that includes the given times associated with the least some of the first data of the pre-computed aggregation keyed based on the same particular entity identifier;

generating a near real-time aggregation for the same given event as the pre-computed aggregation and for the same particular entity identifier as the pre-computed aggregation by combining (i) the near real-time data, which is indicative of the given event and keyed based on the same particular entity identifier, included in the accessed field of the at least one detected data record that is received from the one or more data streams, (ii) with the pre-computed aggregation of data that is indicative of the given event and that is keyed based on the same particular entity identifier, to produce the near real-time aggregation for the given event and for the same particular entity identifier, with the aggregation being near real-time with regard to when the data in the one or more data streams is received;

populating a data record that is keyed based on the same particular entity identifier with the near real-time aggregation for the given event and for the same particular entity identifier, and with data received from the one or more data streams, by:

inserting, into a field of the data record keyed based on the same particular entity identifier, the near real-time aggregation for the given event and for the same particular entity identifier and generated from combining (i) the near real-time data included in the at least one data record detected from the one or more data streams and that is indicative of the given event and that is keyed based on the same particular event identifier, and (ii) the pre-computed aggregation of data that is indicative of the given event and that is keyed based on the same particular event identifier, inserting data from at least one of the data records received from the one or more data streams and keyed based on the same particular entity identifier into another field of the data record being populated and keyed based on the same particular entity identifier; and processing the populated data record by applying one or more rules to the populated data record;

based on applying the rules, writing to memory one or more instructions for initiation of one or more actions; and publishing the one or more instructions to a queue for initiation of the one or more actions.

13. The system of claim 12, wherein inserting the data from the at least one of the data records into the other field of the data record includes:

inserting data from the at least one detected data record into the other field of the data record modified by inserting.

14. The system of claim 12, wherein the operations further include:

collecting a plurality of data records;

publishing the data records to a single queue;

from the queue, detecting the two or more data records;

joining together the detected two or more data records into the first data record, with the detected two or more data records including data representing different types of events; and augmenting the first data record with the combined data for the at least one detected data record.

15. The system of claim 12, wherein the prior time period is a time prior to performance of the detecting.

16. The system of claim 14, wherein the operations further include:

attaching, to the first data record, customer profile data for a customer associated with a particular event included in the first data record; and attaching to the first data record an appendable lookup file (ALF) with a historical aggregation for the particular event.

17. The system of claim 12, with the incremental data including data from a time at which the historical aggregation was computed to a near present time that is within a minute of the present time.

18. One or more machine-readable hardware storage devices storing instructions that are executable to cause the one or more processors to perform operations including:

intermittently receiving data from one or more data streams, the received data including data records, a data record including data indicative of one or more events;

as data from the one or more data streams continue to be received, detecting, in the received data records each keyed based on an entity identifier, two or more data records that are each keyed based on a particular entity identifier;

for at least one detected data record including data indicative of a given event, wherein the at least one detected data record is associated with a particular time, searching for a pre-computed aggregation of first data indicative of the given event and keyed based on the same particular entity identifier as the two or more data records detected in the one or more data streams, wherein at least some of the first data of the pre-computed aggregation, which is indicative of the given event and keyed based on the same particular entity identifier as the two or more data records detected in the one or more data streams, is associated with a given time from a prior time period, with the prior time period being defined as a range of given times associated with the at least some of the first data of the pre-computed aggregation that are keyed based on the same particular entity identifier as the two or more data records detected in the one or more data streams, and wherein the end of the prior time period is prior to or the same as the particular time associated with the at least one data record that is detected in the one or more data streams and that is keyed based on the same particular entity identifier;

accessing near real-time data, which is indicative of the same given event as the pre-computed aggregation and keyed based on the same particular entity identifier as the pre-computed aggregation, from a field in the at least one detected data record and received from the one or more data streams and associated with the particular time that is after or the same as the end of the prior time period that includes the given times associated with the least some of the first data of the pre-computed aggregation keyed based on the same particular entity identifier;

generating a near real-time aggregation for the same given event as the pre-computed aggregation and for the same particular entity identifier as the pre-computed aggregation by combining (i) the near real-time data, which is indicative of the given event and keyed based on the same particular entity identifier, included in the accessed field of the at least one detected data record that is received from the one or more data streams, (ii) with the pre-computed aggregation of data that is indicative of the given event and that is keyed based on the same particular entity identifier, to produce the near real-time aggregation for the given event and for the same particular entity identifier, with the aggregation being near real-time with regard to when the data in the one or more data streams is received;

populating a data record that is keyed based on the same particular entity identifier with the near real-time aggregation for the given event and for the same particular entity identifier, and with data received from the one or more data streams, by:

inserting, into a field of the data record keyed based on the same particular entity identifier, the near real-time aggregation for the given event and for the same particular entity identifier and generated from combining (i) the near real-time data included in the at least one data record detected from the one or more data streams and that is indicative of the given event and that is keyed based on the same particular event identifier, and (ii) the pre-computed aggregation of data that is indicative of the given event and that is keyed based on the same particular event identifier, inserting data from at least one of the data records received from the one or more data streams and keyed based on the same particular entity identifier into another field of the data record being populated and keyed based on the same particular entity identifier; and processing the populated data record by applying one or more rules to the populated data record;

based on applying the rules, writing to memory one or more instructions for initiation of one or more actions; and publishing the one or more instructions to a queue for initiation of the one or more actions.

19. The one or more machine-readable hardware storage devices of claim 18, wherein inserting the data from the at least one of the data records into the other field of the data record includes:

inserting data from the at least one detected data record into the other field of the data record modified by inserting.

20. The one or more machine-readable hardware storage devices of claim 18, wherein the operations further include:

collecting a plurality of data records;

publishing the data records to a single queue;

from the queue, detecting the two or more data records;

joining together the detected two or more data records into the first data record, with the detected two or more data records including data representing different types of events; and augmenting the first data record with the combined data for the at least one detected data record.

21. The method of claim 1, further including:

based on applying one or more rules to the modified data record, detecting that a threshold value is satisfied by the combined data; and based on detecting that the threshold value is satisfied by the combined data, transmitting an alert to a user device.

22. The method of claim 1, wherein data that is keyed based on the same particular identifier includes data that is keyed indirectly based on the same particular identifier or data that is keyed directly based on the same particular identifier.

* * * * *

UNITED STATES PATENT AND TRADEMARK OFFICE
CERTIFICATE OF CORRECTION

| | | |
|---|---|---|
| PATENT NO. | : 11,989,096 B2 | Page 1 of 1 |
| APPLICATION NO. | : 15/360449 | |
| DATED | : May 21, 2024 | |
| INVENTOR(S) | : John MacLean and Paul Veiser | |

It is certified that error appears in the above-identified patent and that said Letters Patent is hereby corrected as shown below:

In the Claims

Column 25, Line 17, Claim 1, delete "least" and insert -- at least --

Column 27, Line 35, Claim 12, delete "least" and insert -- at least --

Column 29, Line 26, Claim 18, delete "least" and insert -- at least --

Signed and Sealed this
Ninth Day of July, 2024

Katherine Kelly Vidal
*Director of the United States Patent and Trademark Office*